(12) United States Patent
Farrell et al.

(10) Patent No.: US 9,454,349 B2
(45) Date of Patent: Sep. 27, 2016

(54) USER INTERFACE PLACEHOLDERS FOR APPLICATION EXTENSIONS

(75) Inventors: Terry Farrell, Dublin (IE); David Åhs, Dublin (IE); Maurizio Cibelli, Dublin (IE); David Mowatt, Dalkey (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 1004 days.

(21) Appl. No.: 13/330,683

(22) Filed: Dec. 20, 2011

(65) Prior Publication Data
US 2013/0159891 A1    Jun. 20, 2013

(51) Int. Cl.
*G06F 3/048*    (2013.01)
*G06F 9/44*    (2006.01)
*G06F 21/12*    (2013.01)
*G06F 9/445*    (2006.01)
*G06F 21/10*    (2013.01)

(52) U.S. Cl.
CPC . *G06F 8/38* (2013.01); *G06F 8/65* (2013.01); *G06F 9/44526* (2013.01); *G06F 21/10* (2013.01); *G06F 21/128* (2013.01); *G06F 3/048* (2013.01)

(58) Field of Classification Search
CPC .......... G06F 3/00; G06F 3/048; G06F 21/10; G06F 21/128; G06F 8/38; G06F 8/65; G06F 9/44526
USPC ....................................................... 715/762
See application file for complete search history.

(56) References Cited

U.S. PATENT DOCUMENTS

| | | | |
|---|---|---|---|
| 6,763,403 B2 | 7/2004 | Cheng et al. | |
| 7,937,458 B2 | 5/2011 | Nanamura et al. | |
| 2003/0014442 A1* | 1/2003 | Shiigi et al. | 707/513 |
| 2004/0148229 A1 | 7/2004 | Maxwell | |
| 2004/0192440 A1 | 9/2004 | Evans et al. | |
| 2005/0240927 A1 | 10/2005 | Hintermeister | |
| 2005/0251786 A1 | 11/2005 | Citron et al. | |
| 2005/0278258 A1* | 12/2005 | O'Donnell | G06Q 30/06 705/59 |
| 2006/0059481 A1 | 3/2006 | Smith et al. | |

(Continued)

FOREIGN PATENT DOCUMENTS

CN    102158536 A    8/2011

OTHER PUBLICATIONS

Chong, Frederick, "Application Marketplaces and the Money Trail", Retrieved at <<http://msdn.microsoft.com/en-us/library/cc325712.aspx>>, Mar. 2008, pp. 10.

(Continued)

*Primary Examiner* — Patrick Riegler
(74) *Attorney, Agent, or Firm* — Tom Wong; Micky Minhas

(57) ABSTRACT

Concepts and technologies are described herein for user interface placeholders for application extensions. In accordance with the concepts and technologies disclosed herein, user interface placeholders are inserted into user interfaces to represent extensions that have been activated or inserted into an application program or file. The placeholders describe the extension, provide instructions for activating the extension via an entitlement process, display visual indicia associated with the extensions, and/or provide functionality that is executed by a device in response to detecting interactions with the placeholders. After completing the entitlement process, the application program, file, placeholder, or extension can be updated manually or by an application callback to reflect the user's entitlement to use the extension.

20 Claims, 14 Drawing Sheets

(56) References Cited

U.S. PATENT DOCUMENTS

| | | | |
|---|---|---|---|
| 2006/0259858 A1 | 11/2006 | Collins et al. | |
| 2007/0044085 A1* | 2/2007 | Stamper et al. | 717/168 |
| 2007/0201655 A1* | 8/2007 | Shenfield | 379/201.01 |
| 2008/0235680 A1* | 9/2008 | Strauss | G06F 8/61 717/178 |
| 2009/0044216 A1* | 2/2009 | McNicoll | 725/5 |
| 2009/0070685 A1 | 3/2009 | Pamu et al. | |
| 2009/0222806 A1 | 9/2009 | Faus et al. | |
| 2010/0011352 A1* | 1/2010 | Chu et al. | 717/174 |
| 2011/0010433 A1* | 1/2011 | Wilburn et al. | 709/219 |
| 2011/0022984 A1* | 1/2011 | van der Meulen et al. | 715/830 |
| 2011/0105150 A1 | 5/2011 | Moon et al. | |
| 2011/0191744 A1 | 8/2011 | Arsanjani et al. | |
| 2012/0095878 A1* | 4/2012 | Feldman | G06Q 30/0641 705/27.1 |
| 2012/0166992 A1* | 6/2012 | Huynh et al. | 715/771 |
| 2012/0221936 A1* | 8/2012 | Patterson | G06Q 20/123 715/230 |
| 2014/0173448 A1* | 6/2014 | Aly et al. | 715/738 |

OTHER PUBLICATIONS

"Windows Marketplace Help", Retrieved at <<http://www.windowshelp.net/windows-marketplace-help/digital-locker.aspx>>, Retrieved Date: Aug. 29, 2011, pp. 3.

Mosher, Barb, "Sharevolution Offers a New Marketplace for SharePoint Online", Retrieved at <<http://www.cmswire.com/cms/enterprise-collaboration/sharevolution-offers-a-new-marketplace-for-sharepoint-online-011508.php>>, Jun. 6, 2011, pp. 8.

"Introduction to Software Update Channels", Retrieved at <<http://msdn.microsoft.com/en-us/library/aa740931%28v=VS.85%29>>, Retrieved Date: Aug. 29, 2011, pp. 7.

"International Search Report", Mail Date: Mar. 28, 2013, Application No. PCT/US2012/069028, Filed date: Dec. 12, 2012, pp. 9.

"First Office Action and Search Report Issued in Chinese Patent Application No. 201210555709.9", Mailed Date: Mar. 23, 2015, 12 Pages.

Translated Chinese Office Action mailed Nov. 23, 2015 for Chinese Patent Application No. 201210555709.9, a counterpart foreign application of U.S. Appl. No. 13/330,683, 12 pages.

* cited by examiner

USER INTERFACE PLACEHOLDERS FOR APPLICATION EXTENSIONS

BACKGROUND

Software and application developers sometimes create add-ins, plug-ins, or other executable code ("extensions") for extending functionality of software or applications. Extensions can be inserted or activated within an application and/or inserted into or used in conjunction with a particular file interacted with using an application. Extensions sometimes are inserted as blocks of functionality within a document or file, as a task pane presented in a user interface generated by software, and/or as a command, status bar, or menu within the application program.

Some extensions are made available for free to users of software applications and some extensions are sold. In many cases, extensions made available for purchase are purchased and/or activated using a multi-step process. For example, a user may input a command for purchasing an extension. Users can be directed or routed to a purchase site such as a web site associated with the extension developer or retailer or a marketplace site that has extensions from multiple providers. After completing the purchase, a user may return to the application, search for the extension or document, and restart the application or refresh a current view to access the extension or perform a set of steps such as opening menus and dialogs and/or choosing commands and options. In some cases, the extension also must be downloaded and/or installed after completing the purchase process.

In some instances, users may have a difficult time locating the extension and/or file in which the extension is inserted. Furthermore, users may be have difficulty remembering or repeating multiple steps previously completed to get to a stage at which the extension could be inserted or activated and/or may be required to repeat those steps. Also, there may be no way to refresh a view within a software application without closing the application and/or the file. As such, users seeking to use extensions may be forced to activate or insert the applications without remembering or having access to the context in which the extension was inserted. As such, users may waste time activating and accessing functionality associated with purchased extensions.

It is with respect to these and other considerations that the disclosure made herein is presented.

SUMMARY

Concepts and technologies are described herein for user interface placeholders for application extensions. In accordance with the concepts and technologies disclosed herein, user interface placeholders are inserted into user interfaces to represent extensions, applications, apps, plug-ins, add-ins, or other software ("extensions") that have been activated or inserted into an application program or file interacted with by the application program. In some embodiments, a list of extensions is presented to a user for selection and/or insertion. The list of extensions can be based upon context of user activity or based upon other considerations such as, for example, a user profile, user usage and/or purchase history, extensions previously used or purchased by the user, most popular extensions, most favorably rated extensions, editorial information, and the like. Upon selecting an extension, a placeholder representing the extension is inserted into the program or file.

The placeholders can describe the extension, provide instructions for activating the extension, provide status relating to activation of the extension, display visual indicia associated with the extensions, and/or provide functionality that is executed by a device in response to detecting interactions with the placeholders. The instructions can vary over time, for example, if time passes between inserting the placeholder and completing activation of the extension and/or can change to reflect different stages or operations of a acquiring or activating the extension including operations that may be completed on external web sites or stores such as billing, review, completing activation, and the like. According to various embodiments, more than one extension and/or placeholder can be inserted at any particular time.

According to various implementations, the extensions require user activity prior to activation. The user activity can include an entitlement process for purchasing the extension, agreeing to usage terms associated with the extension, and/or submitting information to an extension developer, retailer, or other party. Completion of the entitlement process can be completed within the application program or outside of the application program, for example, using a web browser or other application. As used herein, an "entitlement process" includes, but is not limited to, a process for purchasing the extension, a process for reviewing and/or accepting usage terms associated with the extension, a process for submitting user information to an extension developer or retailer, a process for obtaining a trial or time limited trail of the extension, a process for obtaining basic usage rights or advanced usage rights, pre-paying for a period of time, a process for buying a subscription, and/or other processes for entitling a user to activate and/or use the extension such as checking if a user has previously received entitlement to the extension by previously purchasing the extension on another device or by making a different purchase or set of actions that acquire entitlement. The user can be prompted, for example by presentation of a button to "complete" or "continue" activation, to complete a purchase or activation process.

In some embodiments, the entitlement process is hosted by a web server, though this is not necessarily the case. When the entitlement process is completed by a user, a protocol handler, an application callback, or other functionality (hereinafter referred to as an "application callback") can be received by and/or executed by the user device. The application callback can be external to the application or device, internal to the application or device, and/or associated with the placeholder. Other operations are possible, for example, the user device may activate a listening service within the placeholder to await activation and/or entitlement acquisition and/or activate the extension for use when appropriate. As such, the placeholders can provide status or progress updates during activation and/or the entitlement process.

The application callback instructs the user device to search for the placeholder, for an extension associated with the placeholder, or an application program or file within which the extension was inserted. If more than one placeholder is found, the application callback can be optimized to search for a most-recently used application, a topmost window in the operating system, a most-recently-interacted-with placeholder, or the like, to identify the placeholder. The user device can locate the application, extension, file, or placeholder; bring the application or file to the foreground; and refresh the screen display to indicate activation of the extension. In some implementations, the user device converts the placeholder into an active extension user interface using various transition effects that illustrate activation of the extension for the user.

According to one aspect, a user device executes one or more application programs configured to present user interfaces for interacting with the application programs. The application programs can suggest extensions for activation by a user to extend the functionality of the application programs. As mentioned above, the extensions can be suggested in a list of recommendations to the user, among other mechanisms. The list of recommendations can be, but are not necessarily, based upon context of the user, the user's profile, the user's usage and/or purchase history, and other information. If the user device receives input for activating an extension, the user interface can be modified to present a placeholder with a description of the extension functionality, instructions for activating the extension, and visual indicia such as images, icons, or text. The placeholders also can include embedded functionality and also can be used to present suggestions to a user.

According to another aspect, the user device launches an entitlement process in response to detecting an interaction with the placeholder. The entitlement process can be hosted and/or executed by a web server in communication with the user device and completed using a web browser or other application program. After the entitlement process is completed, the user device can download and install the extension. In other embodiments, the extension is stored by the user device. The user device also can refresh the application program to reflect entitlement to the extension.

According to another aspect, the placeholder includes functionality for removing or cancelling insertion, activation, and/or entitlement of the extension. For example, the placeholder can include a "cancel" or "remove" button for closing or removing the placeholder, for example, if a user decides they no longer are interested in the extension, if the extension was accidentally inserted, or for other reasons. The user may decide to remove the extension based upon information inserted in the placeholder, for example. In some embodiments, the application callback described herein is configured to be initiated at the application and to report to external systems or devices such as web sites to cancel an entitlement or acquisition process.

According to another aspect, the user device can execute a application callback to update the placeholder and/or to activate the extension. The application callback can include any handler including, but not limited to, handlers external to the application, for example, at the device level; handlers internal to the application, for example, at the application level; and handlers at a placeholder level. The application callback can be transmitted to or executed by the user device. The application callback can prompt the user device to search for the placeholder, extension, file, or application program referenced by the application callback; bring the application program, file, extension, or placeholder to the foreground; and update the placeholder to reflect the user's entitlement to the extension. Transition effects can be applied to the user interface to reflect this update, if desired.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
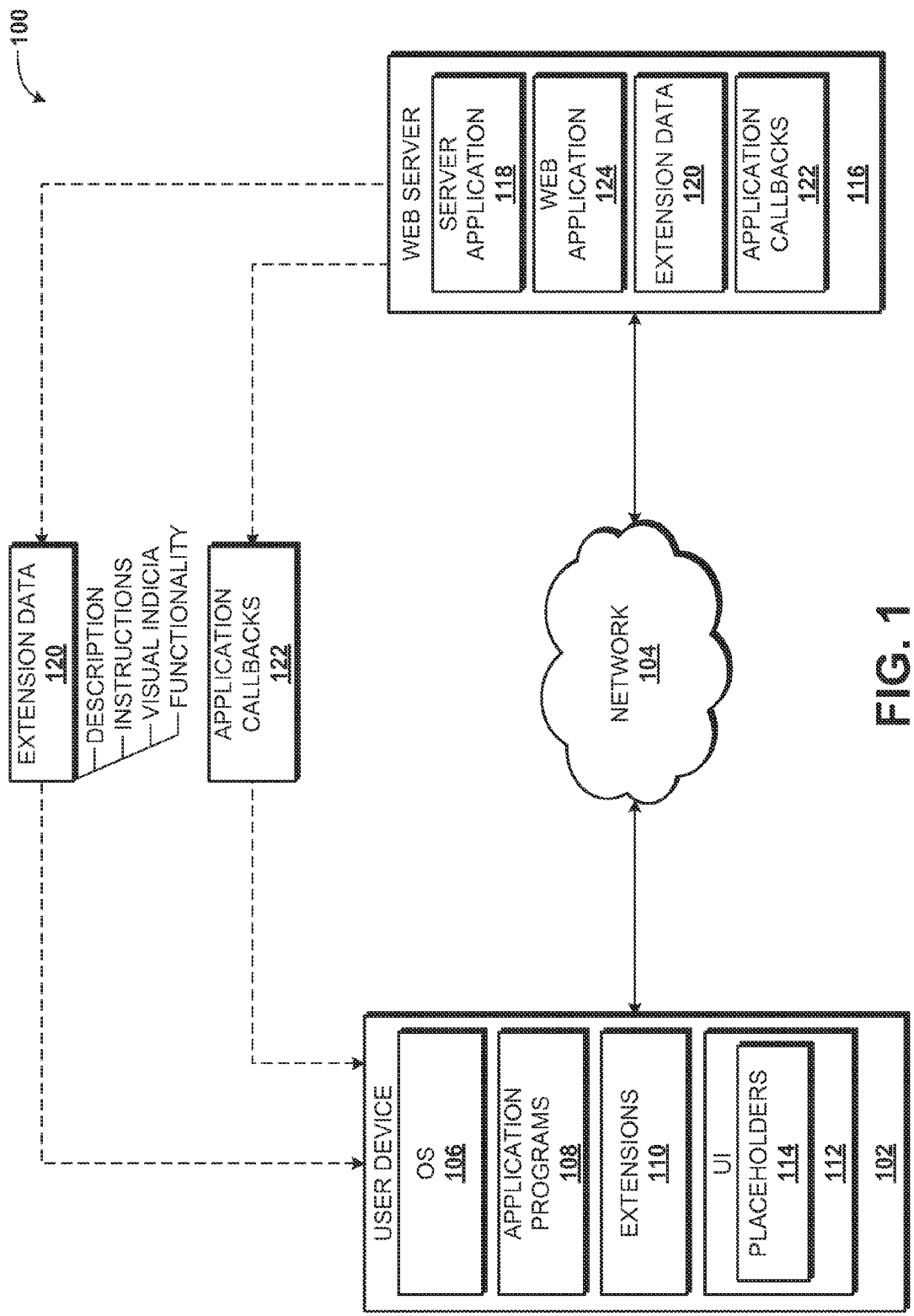
FIG. 1 is a system diagram illustrating an illustrative operating environment for the various embodiments disclosed herein.

The following detailed description is directed to concepts and technologies for user interface placeholders for application extensions. According to the concepts and technologies described herein, user interface placeholders are inserted into user interfaces to represent plug-ins, add-ins, or other software extensions ("extensions") that are activated or inserted into an application program or file. The placeholders can describe the extension, provide instructions for activating the extension via an entitlement process, display visual indicia associated with the extensions, and/or provide functionality that is executed by a device in response to detecting interactions with the placeholders. According to various embodiments, the entitlement process includes, but is not limited to, purchasing rights to use the extension, agreeing to usage terms associated with the extension, and/or submitting information to an extension developer, retailer, or other entity to obtain access to the extension.

The entitlement process can be completed within the application program or file in which the extension is inserted or outside of the application program. In some embodiments, for example, the entitlement process is completed via a web browser or stand-alone application for interacting with a web server that hosts the entitlement process. When the entitlement process is completed by a user, the placeholder can be updated manually or by an application callback received by and/or executed by the user device. The application callback includes computer-executable code that, when executed by the user device, instructs the user device to search for the placeholder, for an extension associated with the placeholder, or an application program or file within which the extension was inserted. The user device can locate the application, extension, file, or placeholder, bring the application or file to the foreground, and refresh the screen display to indicate activation of the extension. In some implementations, the user device converts the placeholder into an active extension user interface using various transition effects that illustrate activation of the extension for the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for user interface placeholders for application extensions will be presented.

Referring now to FIG. 1, aspects of one operating environment 100 for the various embodiments presented herein will be described. The operating environment 100 shown in FIG. 1 includes a user device 102. According to various embodiments, the functionality of the user device 102 is provided by a personal computer ("PC") such as a desktop, tablet, or laptop computer system; a server computer; a mobile computing device such as a handheld computer, a tablet computer; or another type of computing device. In some embodiments, the user device 102 is configured to operate in communication with a communications network ("network") 104, though this is not necessarily the case. The network 104 can include any type or combination of communications networks. Because the user device 102 can operate in a stand-alone computing environment, it should be understood that the embodiment shown in FIG. 1 is illustrative, and should not be construed as being limiting in any way.

The user device 102 is configured to execute an operating system 106 and one or more application programs 108. The operating system 106 is a computer program for controlling the operation of the user device 102. The application programs 108 are executable programs configured to execute on top of the operating system 106 to provide various types of functionality for the user device 102. In some embodiments, for example, the application programs 108 include one or more, or a suite, of application programs such as web browsers, customer relationship management software, personal information management software, productivity software, other application programs, combinations thereof, and the like. For example, in one contemplated embodiment of the user device 102, the application programs 108 include one or more members of the MICROSOFT OFFICE family of products from Microsoft Corporation in Redmond, Wash. It should be understood that this embodiment is illustrative, and should not be construed as being limiting in any way.

The application programs 108 can create, save, modify, and/or perform operations on one or more documents or other files (hereinafter collectively and/or generically referred to as "files"). In some embodiments, the file includes an MS WORD document file; an MS EXCEL spreadsheet file; an MS POWERPOINT presentation file; an MS ACCESS database file; and/or other types of files or documents. Because the concepts and technologies disclosed herein can be used with any type of software, it should be understood that these embodiments of the application programs 108 and the file are illustrative, and should not be construed as being limiting in any way.

In various implementations of the concepts and technologies disclosed herein, the application programs 108 executed by the computing device 102 are configured to interact with one or more plug-ins, add-ins, extensions, or other software (hereinafter collectively and/or generically referred to as "extensions") 110. Although shown as being stored at the user device 102, it should be understood that the extensions 110 can be stored at locations remote from the user device 102 and downloaded by the user device 102 after installing or activating the extensions 110 as described in more detail below. Once installed and/or activated, the extensions 110 can interact with the application programs 108, can support interactions with the application programs 108 by external resources or computing devices via the network 104, and/or can enable other functionality. According to various embodiments, the extensions 110 include, but are not limited to web add-ins and/or other types of extensions. It should be understood that this embodiment is illustrative, and should not be construed as being limiting in any way.

The application programs 108 also are configured to generate one or more user interfaces ("UIs") 112. The UIs 112 can provide users with visual interfaces for interacting with functionality associated with the application programs 108. The UIs 112 also can include UI controls for accessing functionality associated with the extensions 110. Thus, for example, a UI 112 presented by an application program 108 can be modified to include controls for accessing functionality associated with one or more extensions 110 when the extension 110 is installed and/or activated. The UIs 112 also can present one or more placeholders 114 for indicating available extensions 110 and/or extensions 110 that are not activated.

As used herein, "placeholders" such as the placeholders 114 are visual indicators and/or containers for executable code that can act as handlers for listening for changes. The placeholders 114 are inserted into the UI 112 by extensions 110 and/or the application programs 108 to indicate that functionality associated with the extensions 110 is available for purchase, download, installation, and/or activation. According to various embodiments of the concepts and technologies disclosed herein, the user device 102 receives input for inserting an extension 110 into an application program 108 or into a file interacted with using the application program 108. In response to this input, the user device 102 inserts a placeholder 114 in the UI 112 to visually indicate to a user the availability of the extension 110, what functionality associated with the extension 110 is, as well as to provide a visual cue to users that steps remain before the functionality associated with the extension 110 is accessible.

The placeholders 114 can include visual indicia such as, for example, a title of the extension 110, images, icons, and/or text descriptions of functionality associated with the extension 110, and/or user interface controls for activating and/or purchasing the extensions 110. The placeholders 114 also can provide various views and/or user interfaces for completing a purchase or other entitlement process. As used herein, an "entitlement process" includes purchase processes as well as other processes that may be completed to obtain access to an extension such as, for example, acceptance of usage terms, submission of user information, creation of accounts at web sites, retailers, or other locations, requesting download or activation of a trial version of the extension 110, other processes, and the like. In some embodiments, the placeholder 114 include a "continue" or "complete" button or other functionality for continuing activation of an extension 110, for example after a user completes a purchase or other entitlement action; a "cancel" or "remove" button or other functionality for removing or cancelling activation or insertion of the extension 110, for example if the extension 110 was accidentally inserted or a user changes his or her mind; other functionality, and the like. These and other aspects of an entitlement process can be controlled via user interfaces presented by the placeholders 114, via other application programs 108 executing at the user device 102, and/or prompted by computer-executable code embedded within the placeholders 114.

According to some implementations, the operating environment 100 includes one or more web servers 116 operating as part of, or in communication with, the network 104. The user device 102 can be configured to communicate with the web server 116 via the network 104 to complete an entitlement process, to obtain information associated with extensions 110, and/or to download the extensions 110. In some embodiments, the web server 116 hosts a server application 118 configured to store and/or execute the entitlement process. The server application 118 also can manage the hosting and/or serving of extension data 120 and/or the extensions 110. The user device 102 can access the web application 124 in response to detecting a request to purchase an extension 110 at the user device 102, when extension suggestions are generated for a user, or to download the extension 110 after completing an entitlement process or at other times.

According to various embodiments, the user device 102 requests information about extensions 110 and the web server 116 responds by providing the extension data 120. The extension data 120 can include, but is not limited to, description data, instructions data, visual indicia data, functionality data, other data, and the like. The description data can describe extensions 110 and can include, for example, title information, information describing functionality of the extensions 110, price information indicating prices for one or more versions of the extension 110, trial version information, other information, and the like. The instructions data can include instructions for activating and/or purchasing the extension 110 and other information. The visual indicia can include images, icons, or other visual information. The functionality data can include computer-executable instructions that are executed at the user device 102 when the extension 110 is accessed or activated by a user or application program 108.

The web server 116 also can be configured to store one or more application callbacks 122. The application callbacks 122 are computer-executable instructions that, when executed by the user device 102, prompt any number of actions. In some embodiments, for example, execution of the application callbacks 122 prompts the user device 102 to search the application programs 108 for applications identified by the application callbacks 122, to determine if any extensions 110 identified by the application callbacks 122 are inserted in documents or applications executing at the user device 102, and/or to take various actions with respect to the extensions 110. The application callbacks 122 also can prompt the user device 102 to search for placeholders 114. As will be explained in more detail below, the application callbacks 122 can be passed from the web server 116 to the user device 102 to activate an extension 110, to refresh a screen display presented by one or more of the application programs 108, to bring specific application programs 108 to the foreground, to scroll the placeholder 114 into view within a document, and/or for other purposes. These and other aspects of the application callbacks 122 are illustrated and described in more detail below, particularly with respect to FIG. 3.

According to some embodiments, the application callbacks 122 include one or more protocol handlers. According to some embodiments, the application callback 122 is configured to ping an application callback webservice to determine if the extension 110 is ready to be installed or activated. In another embodiment, the application callback 122 maintains an open http:// request to the application callback webservice. In this embodiment, the request can be renewed if the request times-out. When the extension 110 is ready for activation, the web server 116 can call back by sending a response via the application callback webservice to the placeholder 114. According to yet another embodiment, a web browser is used to complete the entitlement process. During the process, a cookie is written to the user device 102 by the web server 116. The user can simply enter an ALT-TAB keystroke command to return to the application window UI 112, and when the application gets focus returned to it by the operating system, the application can use this event to initiate reading from the cookie if entitlement for the extension 110 is complete. It should be understood that these embodiments are illustrative, and should not be construed as being limiting in any way.

According to one embodiment, an application program 108 generates an add-in or other extension suggestion for presentation to a user. In response to receiving input for activating or inserting the extension 110 into the application program 108 or a file interacted with via the application program 108, the user device 102 inserts a placeholder 114 into a user interface 112 presented by the application program 108. The placeholder 114 includes data describing the extension 110, instructions for activating the extension 110, visual indicia such as images or text, and embedded functionality that can prompt various actions by the user device 102. As mentioned above, the data can be downloaded as the extension data 120 from the web server 116 or other device.

In response to detecting input from a user for activating or purchasing the extension 110, the user device 102 can access the web server 116 to complete an entitlement process. After the entitlement process is completed, the web server 116 can issue a application callback 122 to the user device 102. The application callback 122 includes computer executable instructions that, when executed by the user device 102, cause the user device 102 to search for an application program 108, placeholder 114, or file referenced by the application callback 122. The application callback 122 also can command the user device 102 to download the extension 110 from the web server 116 or from another download location.

Upon identifying the referenced application program 108, placeholder 114, or file, the user device 102 brings the application program 108 or file to the foreground, refreshes the view and/or the placeholder 114, and presents the activated extension 110. In some embodiments, the user device 102 updates the placeholder 114 using visual transition effects to indicate to the user that the placeholder 114 is replaced with the activated extensions 110. As such, the user's attention can be drawn to the newly activated extension 110.

In some embodiments, the web server 116 can be configured to generate new, alternative, or upsell suggestions for a user during the entitlement process. For example, a user may receive a suggestion to purchase an extension 110 entitled "ExtensionA," and may select that extension 110. In response to this selection, a placeholder for "ExtensionA" may be placed in the document or UI 112. During the entitlement process described herein, the user may be suggested to upgrade to "ExtensionB" or other extensions 110. In response to electing this suggestion, the user device 102 can update the placeholder 114 with a placeholder for "ExtensionB." It should be understood that this embodiment is illustrative, and should not be construed as being limiting in any way.

Also, while the description describes embodiments with a single placeholder 114 for simplicity, it should be understood that the user device 102 can be configured to insert multiple placeholders 114. The placeholders 114 may or may not be related to one another and may or may not be different from one another. For example, in addition to having varied underlying functionality, the placeholders 114 can include one or more content web add-ins and task pane web add-ins, other types of extensions 110 and the like. It should be understood that these embodiments are illustrative, and should not be construed as being limiting in any way.

FIG. 1 illustrates one user device 102, one network 104, and one web server 116. It should be understood, however, that some implementations of the operating environment 100 include multiple user devices 102, multiple networks 104, and/or multiple web servers 116. Thus, the illustrated embodiments should be understood as being illustrative, and should not be construed as being limiting in any way.

Figure 2:
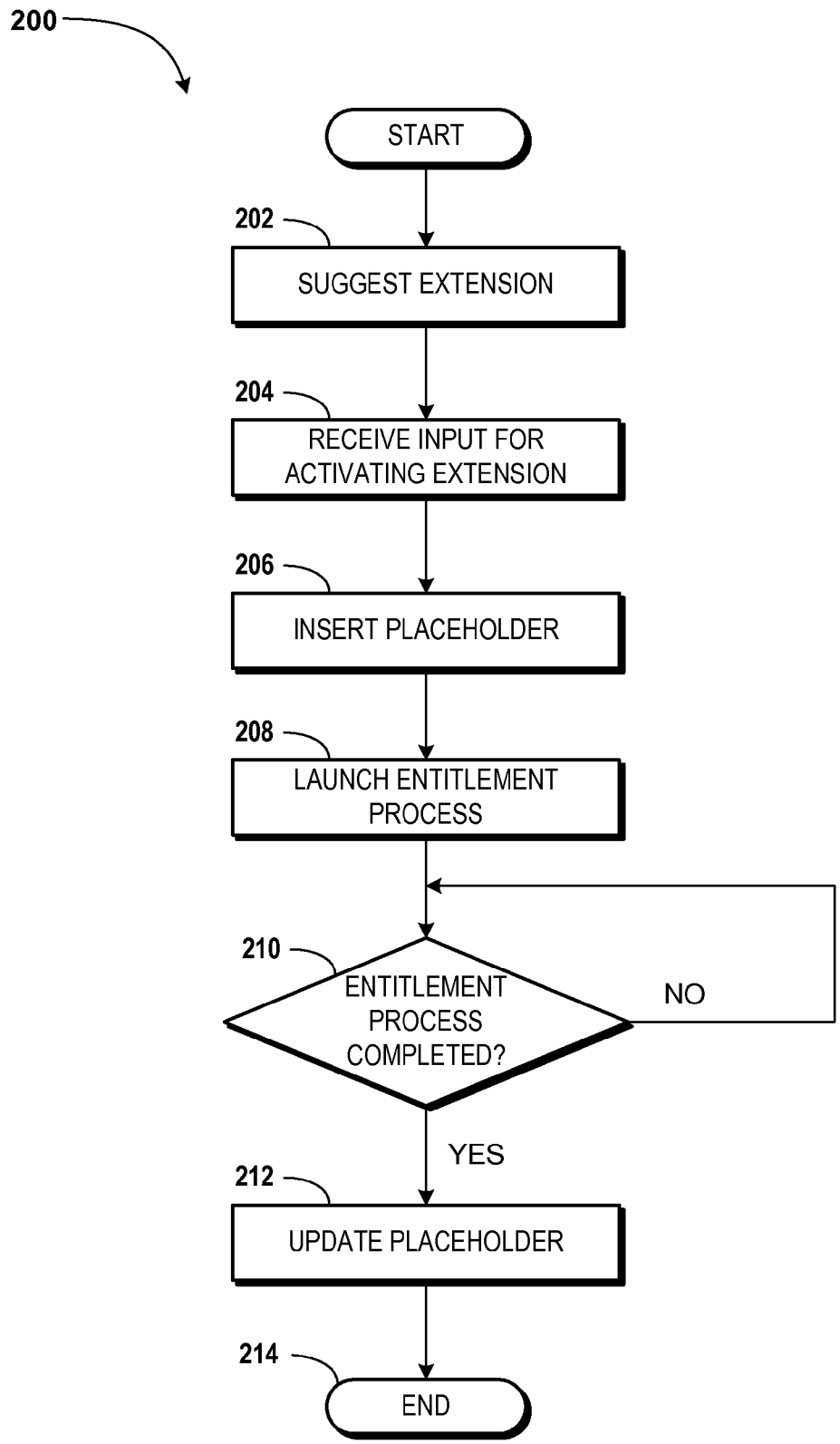
FIG. 2 is a flow diagram showing aspects of a method for presenting user interface placeholders for application extensions, according to an illustrative embodiment.

Turning now to FIG. 2, aspects of a method 200 for presenting user interface placeholders for application extensions will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods described herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the user device 102 via execution of one or more of the application programs 108. It should be understood that these embodiments are illustrative, and should not be construed as being limiting in any way. The method 200 begins at operation 202, wherein the user device 102 suggests an extension 110. According to various implementations, one or more of the application programs 108 can suggest extensions 110 for insertion or activation at the user device 102. The suggestions also can be generated by other devices or applications in communication with the user device 102. The suggestions can be based upon, for example, contextual information such as files with which the application programs 108 are interacting, extension purchasing and/or activation histories associated with the user device 102, extension updates or availability, and the like.

In some embodiments, the suggestions are provided to users within an application window or other UI 112 associated with one or more of the application programs 108. For example, the suggestions can be provided within an add-in management window or menu. In other embodiments, the suggestions are shown inside a placeholder 114. In yet other embodiments, the suggestions are shown in an application user interface. One contemplated example of a user interface for presenting a suggestion within an add-in management window is illustrated and described below with reference to FIG. 4A. In other embodiments, the suggestions can be provided in alert windows, side panes, or outside of the application programs 108, if desired. As such, it should be understood that suggestions for adding the extension 110 can be provided in various ways. For purposes of describing the concepts and technologies disclosed herein, the suggestion is described as being provided in an add-in management menu or window. It should be understood that this embodiment is illustrative, and should not be construed as being limiting in any way.

From operation 202, the method 200 proceeds to operation 204, wherein the user device 102 receives input for activating an extension 110 such as the suggested extension 110. In some embodiments, a user may click on an option to activate or insert the extension 110 into an application program 108 or a file with which the application program 108 is interacting. The input can be received via any type of input supported by the user device 102 including, but not limited to mouse clicks, finger taps, voice commands, keystroke commands, combinations thereof, and the like.

From operation 204, the method 200 proceeds to operation 206, wherein the user device 102 inserts a placeholder 114 into a UI 112 presented by one or more of the application programs 108. The placeholder 114 provides a visual indicator to a user that an extension 110 is available and/or has been inserted into a document or other file. The placeholder 114 also indicates that the extension 110 is not yet activated or usable without additional action by the user. For example, the placeholder 114 can indicate that an extension 110 requires a user to complete a purchase process, a terms agreement process, an information-submission process, or other steps to entitle the user to use or activate the extension 110. It should be understood that this embodiment is illustrative, and should not be construed as being limiting in any way.

According to various implementations, the placeholder 114 is inserted into a menu, command ribbon, document or other file; UI 112 presented the application program 108; or elsewhere. The placeholder 114 can include an icon, an image, a menu, a side panel, or another user interface object. The placeholder 114 can include various data including, but not limited to, the extension data 120 illustrated and described above with regard to FIG. 1. Thus, although not illustrated in FIG. 2, it should be understood that the user device 102 can request, access, and/or receive the extension data 120 from the web server 116 when an extension 110 is suggested, when input for activating the extension is received, or at other times, and present this information as part of or as the placeholder 114.

From operation 206, the method 200 proceeds to operation 208, wherein the user device 102 initiates, prompts, begins, or launches ("launches") an entitlement process. Thus, it should be understood that the entitlement process can be automatically or manually initiated. In some embodiments, the entitlement process is completed by the user device 102 via interactions with the web server 116. As such, the user device 102 can access the web server 116, identify the extension 110 and/or application program 108, and start the entitlement process. The entitlement process can include going to a marketplace to search for an extension 110 or other item, paying for the extension 110, accepting usage terms associated with the extension 110, obtaining activation codes for the extension 110, and/or submitting data such as user information and the like.

In some embodiments, the entitlement process is launched by the user device 102 via a web browser or stand-alone application for accessing the web server 116. In other embodiments, the application program 108, the extension 110, and/or the placeholder 114 includes functionality for launching an in-application entitlement process for purchasing or otherwise obtaining rights to use the extension 110. Some contemplated user interfaces for conducting the entitlement process are illustrated and described below with reference to FIGS. 4C and 4D.

Although not shown in FIG. 2, the entitlement process can be launched by the user device 102 in response to inserting the placeholder 114 into an application program 108 or file, in response to detecting a click or other user input indicating user interaction with the placeholder 114, in response to a user selecting an option to activate the extension 110, or in response to other actions. In some embodiments, the user device 102 automatically launches the entitlement process each time an application program 108 or file with an inserted extension 110 is opened at the user device 102 if the extension 110 has not yet been activated. It can be appreciated from the description herein that the user device 102 can determine that inactive extensions 110 are inserted into application programs 108 or files by detecting the presence of one or more placeholders 114 in the application programs 108 or files. It should be understood that these embodiments are illustrative, and should not be construed as being limiting in any way.

As used herein, an entitlement process can include a process in which the extension 110 or functionality associated with the extension 110 is purchased by completing a payment process. The entitlement process also can include other processes that may be required to entitle a user to use the extension 110. For example, some extensions 110 can be offered as trial versions or free versions that require users to agree to usage terms or submit information prior to activation or usage. Thus, an entitlement process also can include agreeing to terms or submitting information. In other embodiments, an entitlement process includes creating an account with a service on the web server 116 or submitting information to the web server 116, for example. Because other steps can be required by extension developers or retailers, these embodiments should be understood as being illustrative and should not be construed as being limiting in any way From operation 208, the method 200 proceeds to operation 210, wherein the user device 102 determines if the entitlement process launched in operation 208 is completed. In some embodiments, the user device 102 can actively monitor or check the status of the entitlement process to determine when the entitlement process is completed. In other embodiments, the user device 102 passively waits for an indication that the entitlement process has been completed. In some embodiments, this indication comes by way of a application callback 122, as explained in FIG. 1 and as will be described in more detail below with reference to FIG. 3. In other embodiments, the user device 102 receives a command to refresh the application program 108 or file in which the extension 110 is inserted, indicating that the entitlement process has been completed. In yet other embodiments, the placeholder 114 waits until the UI 112 again has focus or the topmost window in the operating system or browser, and uses this indication as an indication that the entitlement process is complete. Because other embodiments for detecting completion of the entitlement process are contemplated, it should be understood that these embodiments are illustrative, and should not be construed as being limiting in any way.

If the user device 102 determines, in operation 210, that the entitlement process is not completed, the method 200 can return to operation 210. Thus, the user device 102 can pause execution of the method 200 at operation 210 until the user device 102 determines that the entitlement process is completed. If the user device 102 determines, in any iteration of operation 210, that the entitlement process has completed, the method 200 proceeds to operation 212.

At operation 212, the user device 102 updates the placeholder 114 inserted in operation 206. The user device 102 can be prompted manually to update the placeholder 114 or can automatically update the placeholder 114. In some embodiments, for example, the application callback 122 is used to update the placeholder 114, as illustrated and described below with reference to FIG. 3. In other embodiments, the placeholder 114 includes a "continue" or "complete" button that is selected by a user to update the placeholder 114; the user or user device 102 can restart the application in which the placeholder 114 was inserted to update the placeholder 114; the user or user device 102 can refresh the screen of the application to update the placeholder 114, the user or user device 102 can access the application via, for example, an ALT-TAB keystroke command to access the application window and refresh the view; or other functionality can be used to prompt updating of the placeholder 114.

As explained herein, the placeholder 114 can indicate that an extension 110 is available or has been inserted, but that functionality of the extension 110 is limited for some reason. Thus, the operation 212 can include updating the placeholder 114 to indicate that the extension 110 is now activated or available. In some embodiments, the user device 102 updates the placeholder 114 using one or more transition effects to indicate activation of the extension 110. One contemplated embodiment of transition effects are illustrated and described below with reference to FIGS. 4F-4H. Although not shown in FIG. 2, the user device 102 can be configured to download the extension 110 after the entitlement process is completed as part of, or before, the update of the placeholder 114 is completed.

Furthermore, although not shown in FIG. 2, some embodiments of the concepts and technologies disclosed herein include presenting, recommending, and/or inserting placeholders 114 in response to completing updating of the placeholder 114. Thus, for example, completion of the entitlement process described herein can result in further placeholders 114 being injected by the now-activated placeholder 114, and each of, or the group of, new placeholders 114 further can require entitlement prior to activation. In other embodiments, the new placeholders 114 can be inserted as trial versions as part of activation of the placeholder 114. It should be understood that this embodiment is illustrative, and should not be construed as being limiting in any way.

From operation 212, the method 200 proceeds to operation 214. The method 200 ends at operation 214.

Figure 3:
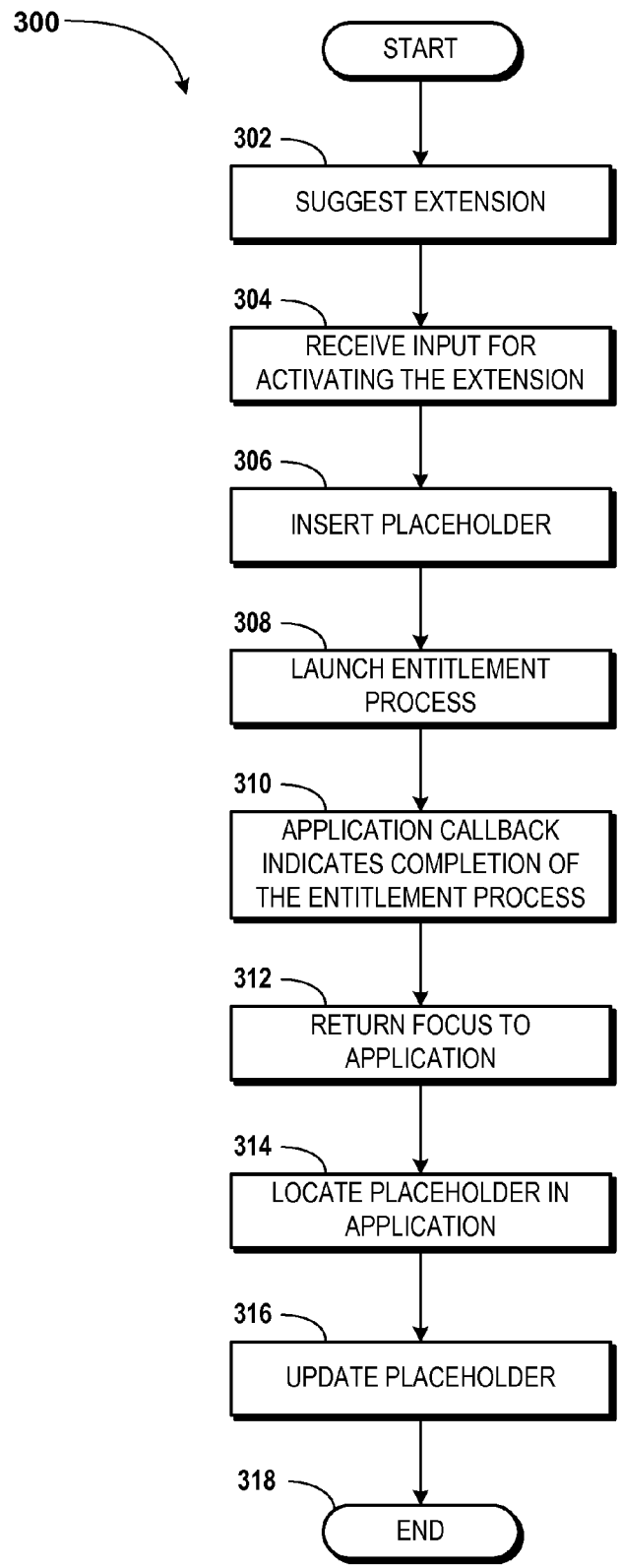
FIG. 3 is a flow diagram showing aspects of a method for presenting user interface placeholders for application extensions, according to another illustrative embodiment.

Turning now to FIG. 3, aspects of a method 300 for presenting user interface placeholders for application extensions will be described in detail, according to another illustrative embodiment. The method 300 begins at operation 302, wherein the user device 102 suggests an extension 110 to a user. From operation 302, the method 300 proceeds to operation 304, wherein the user device receives input for activating the extension 110. From operation 304, the method 300 proceeds to operation 306, wherein the user device inserts a placeholder 114 into a UI 112 presented by one or more of the application programs 108. From operation 306, the method 300 proceeds to operation 308, wherein the user device 102 launches an entitlement process. It should be understood that the operations 302-308 can be, but are not necessarily, similar or even identical to the operations 202-208 described above with regard to the method 200 illustrated in FIG. 2.

From operation 308, the method 300 proceeds to operation 310, wherein the user device 102 receives or executes a application callback 122, indicating completion of the entitlement process. In one contemplated embodiment, the application callback 122 is included in a web page viewed by a web browser to complete the entitlement process. As such, the application callback 122 can be accessed by the user device 102 during the entitlement process. As explained above, the application callback 122 can include computer-executable instructions that, when executed by the user device 102, cause the user device 102 to search for particular application programs 108, extensions 110, and/or placeholders 114. In the illustrated embodiment, the application callback 122 is provided by the web server 116 and includes data identifying the extension 110 for which the entitlement process was launched in operation 308.

In other embodiments, computer-executable code corresponding to the application callback 122 is transmitted to the user device 102 and used to trigger various functionality described herein. For example, the web server 116 can be configured to issue the application callback 122 in response to detecting completion of the entitlement process, though this is not necessarily the case. The application callback 122 received or executed in operation 310 can identify the extension 110, the application program 108 within which the extension 110 and/or the placeholder 114 is inserted, and information indicating that the user or user device 102 is now entitled to use the extension 110. The application callback 122 includes, in various embodiments, rich parameters that indicate, for example, trial modes, additional steps to be taken by the user, commands to refresh a UI presenting the placeholder 114, and/or other parameters. In the illustrated embodiment, the operations 312-316 described below are prompted by the application callbacks 122, though this is not necessarily the case.

In yet other embodiments, the application programs 108 include a web browser or web-based OS that is or are executed by the user device 102. The browser or web-based OS can be executed by the user device 102 to access a web service or web application. The extension 110 can correspond to a web extension purchased by the user for the web application and as such, the functionality described herein with respect to the application callbacks 122 can be provided, in various embodiments, by callback functions or similar functionality. As such, the embodiments disclosed herein with respect to the application callbacks 122 is illustrative of some contemplated embodiments and should not be construed as being limiting in any way.

From operation 310, the method 300 proceeds to operation 312, wherein the user device 102 returns focus of the user device 102 to an application program 108 identified by the application callback 122. In some embodiments, for example an embodiment illustrated below with reference to FIG. 4C, the entitlement process is completed within the application program 108 and as such, the operation 312 may be skipped. In other embodiments, for example an embodiment illustrated below with reference to FIG. 4D, the user device 102 launches the entitlement process in one of the application programs 108 other than the application program 108 in which the extension 110 or placeholder 114 has been inserted. As such, the operation 312 can include returning focus of the user device 102 to the application program 108 into which the extension 110 or placeholder 114 has been inserted.

In some embodiments, operation 312 includes bringing the application program 108 to the foreground of a screen display. In other embodiments, operation 312 returns focus of the user device 102 to the application program 108 without updating a screen display. As such, the functionality described with respect to operation 312 can be performed without being visible to the user, if desired, or can be completed with visibility to the user to draw the user's attention to the application program 108.

From operation 312, the method 300 proceeds to operation 314, wherein the user device 102 locates the placeholder 114 within the application program 108. The application callback 122 can identify the application program 108, the extension 110, and/or the placeholder 114 by name or other identifier. As such, the user device 102 can search for the application program 108, the extension 110, and/or the placeholder 114.

From operation 314, the method 300 proceeds to operation 316, wherein the user device 102 updates the placeholder 114. The user device 102 modifies the placeholder 114 to instead provide an active user interface control for accessing the extension 110. As mentioned above, the user device 102 can provide various visual transition effects to indicate updating the placeholder 114, if desired. Thus, the user device 102 can be configured, by executing operations 312-316, to draw a user's attention to the extension 110 and to visually represent to the user that the extension 110 has been activated. One contemplated transition effect is illustrated and described below with reference to FIGS. 4F-4H. Although not shown in FIG. 3, the user device 102 also can be configured to download the extension 110 after the entitlement process is completed.

From operation 316, the method 300 proceeds to operation 318. The method 300 ends at operation 318.

Figure 4A:
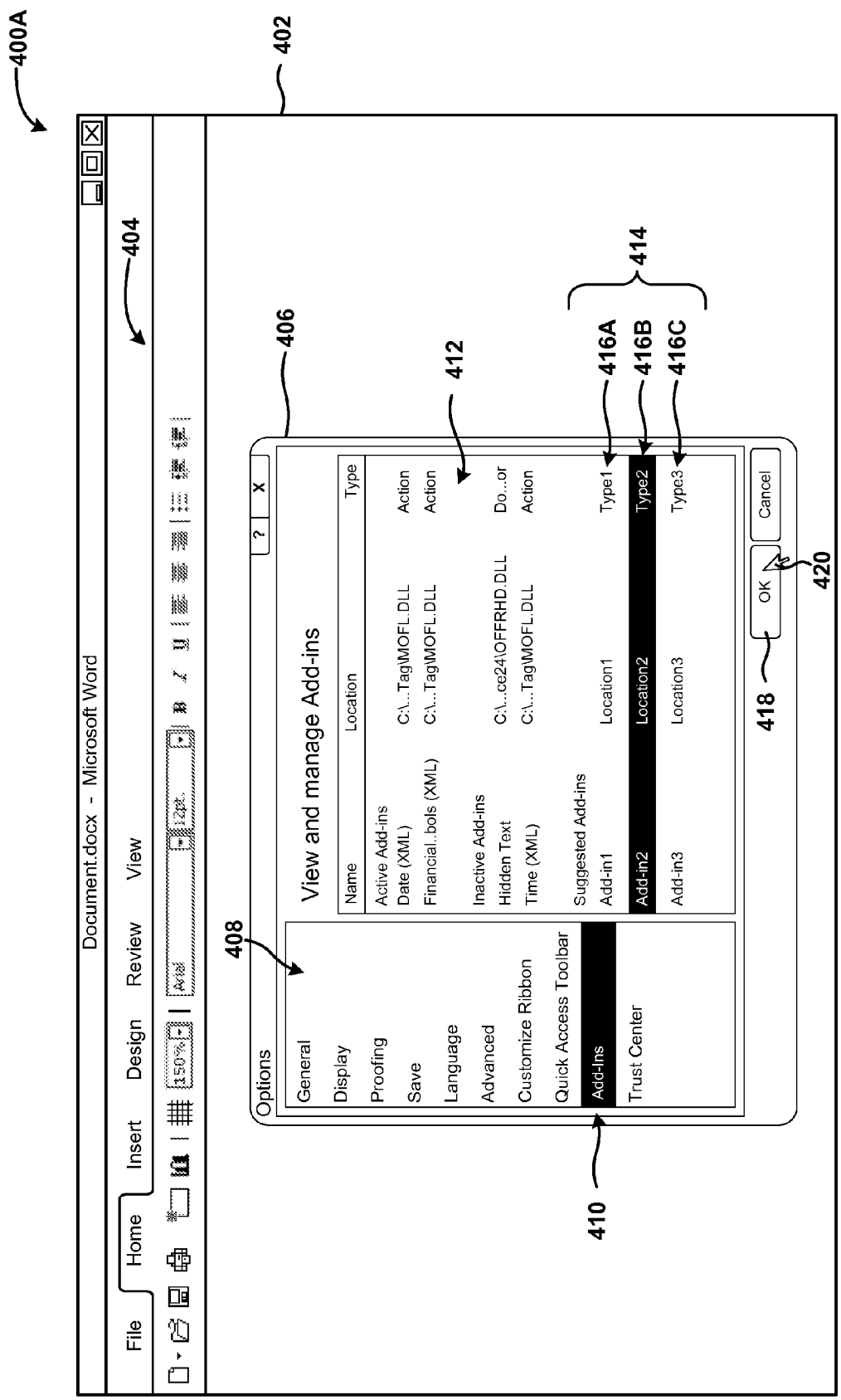
FIGS. 4A-4H are user interface diagrams showing aspects of user interfaces for presenting and modifying user interface placeholders for application extensions, according to various illustrative embodiments.

Turning now to FIGS. 4A-4H, UI diagrams showing various aspects of the concepts and technologies disclosed herein for presenting user interface placeholders for application extensions will be described according to various illustrative embodiments. In particular, FIG. 4A shows a screen display 400A generated by one or more application programs 108 executing at the user device 102. In the illustrated embodiment, the screen display 400A is generated by a member of the MICROSOFT WORD family of word processing software applications from Microsoft Corporation in Redmond, Wash. It should be appreciated that this example is illustrative and therefore should not be construed as being limiting in any way.

As shown in FIG. 4A, screen display 400A includes an application window 402. The application window 402 can include various menus and/or menu options. In the illustrated embodiment, the application window 402 includes a command ribbon 404. In other embodiments, the command ribbon 404 is omitted or supplemented with other menus, command options, or the like. The screen display 400A also can present an options window 406 for managing various aspects of the application program 108 with which the application window 402 is associated. The options window 406 includes an option menu 408 for presenting various options. The options shown in the option menu 408 include an add-ins option 410 for viewing and managing add-ins or other extensions. The add-ins option 410 is illustrated in FIG. 4A as highlighted, indicating that the add-ins option 410 has been selected and/or is currently the focus of the options window 406. It should be understood that this embodiment is illustrative, and should not be construed as being limiting in any way.

Selection of the add-ins option 410 can prompt the user device 102 to modify the options window 406 to display an add-ins details window 412. The add-ins details window 412 presents active and inactive add-ins, as well as information describing the active and/or inactive add-ins. According to various implementations of the concepts and technologies disclosed herein, the add-ins details window 412 includes a suggestion area 414 for presenting suggested extensions or other add-ins 416A-C (hereinafter collectively and/or generically referred to as "suggested add-ins 416") and information relating to the suggested add-ins 416 such as storage locations associated with the suggested add-ins 416, add-in types associated with the suggested add-ins 416, and/or other information (not shown).

As explained above with reference to FIGS. 1-3, the suggested add-ins 416 can be provided to users in a number of ways and as such, the illustrated embodiment must be understood as being illustrative. In particular, other embodiments of the concepts and technologies disclosed herein include presenting the suggested add-ins 416 to users in an alert window, in electronic messages, within or as placeholders 114 within the UI 112, within documents or other files, or via other methods.

In the embodiment shown in FIG. 4A, a user has selected the representation of the suggested add-in 416B and is selecting an "OK" option 418 to accept selection of the suggested add-in 416B. A mouse pointer 420 is shown as being used to select the OK option 418 in FIG. 4A for ease of illustration. It should be understood, however, that embodiments of the concepts and technologies disclosed herein include implementations using touch-based interfaces, voice-command-driven interfaces, and/or other user interfaces. As such, it should be understood that this embodiment is illustrative, and should not be construed as being limiting in any way.

Figure 4B:
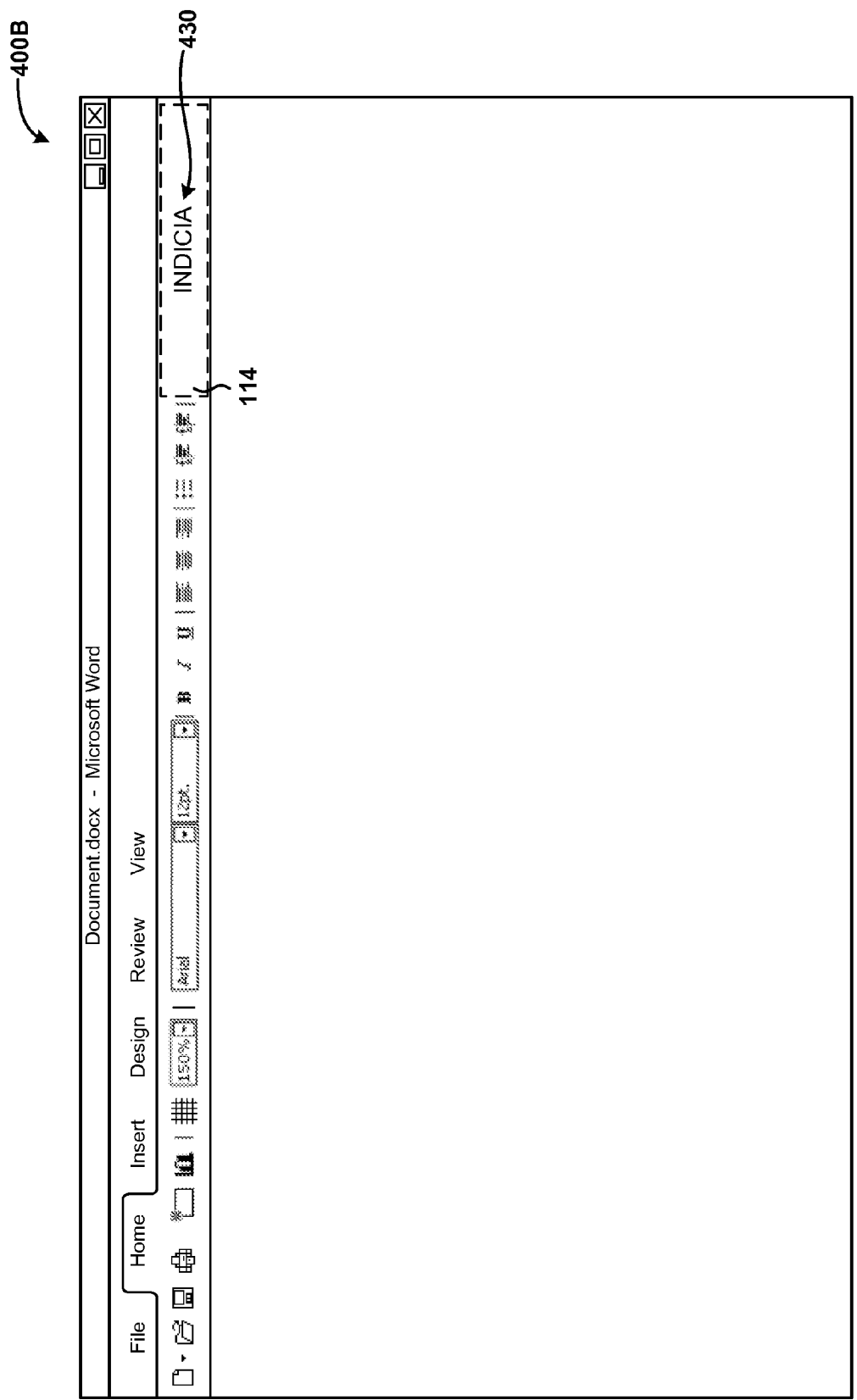

Turning now to FIG. 4B, additional aspects of the concepts and technologies disclosed herein for presenting user interface placeholders for application extensions will be described according to another illustrative embodiment. In particular, FIG. 4B shows a screen display 400B generated by one or more application programs 108 executing at the user device 102. It should be appreciated that the screen display 400B illustrated in FIG. 4B is illustrative and should not be construed as being limiting in any way.

The screen display 400B shown in FIG. 4B can be, but is not necessarily, generated by the user device 102 in response to selection of the OK option 418 in FIG. 4A. As shown, the screen display 400B includes a placeholder 114. The placeholder 114 can be inserted into the screen display 400B generated by the user device 102 in response to detecting a command to insert an extension 110 in the application programs 108 or into a file interacted with using the application programs 108. In some embodiments, the screen display 400B is used to present a suggested add-in by way of the placeholder 114 instead of in response to inserting the suggested extension 110.

As mentioned above, the placeholder 114 can include indicia 430. The indicia 430 can include, for example, a text description of an extension 110 associated with the placeholder 114, an image or icon associated with the extension 110, instructions for activating or using the extension 110, and the like. Because the placeholder 114 can be used to suggest an extension 110, the placeholder 114 also can include advertisements for the extension 110 and/or suggested add-ins such as the suggested add-ins 416 illustrated in FIG. 4A. The placeholder 114 also can include functionality that may be executed by the user device 102 in response to detecting a click or other user input for interacting with the placeholder 114, as explained above with regard to the extension data 120. In one embodiment, clicking on or otherwise interacting with the placeholder 114 can launch a web browser or other application program 108 to purchase the extension 110.

While the placeholder 114 is illustrated as being inserted into the command ribbon 404, it should be understood that this embodiment is illustrative. In particular, the concepts and technologies disclosed herein for presenting placeholders 114 can be used to present the placeholders 114 as task panes, side panels, or other locations. Additionally, the concepts and technologies disclosed herein can be used to provide placeholders 114 within other application programs 108 such as gaming environments, photo slide shows, and the like.

For example, a placeholder 114 can be provided within a gaming environment to allow users to purchase objects or characters within the gaming environment. A character within a gaming environment, for example, can be shown as a placeholder 114. In this example, the placeholder 114 for the character can be shown as a skeleton or outline with indicia 430 for indicating that an extension 110, in this case the character, can be purchased. Similarly, a placeholder 114 in a slide shown can include a low-resolution version of a photo with indicia 430 indicating that the hi-resolution version of the photo, the extension 110, can be purchased by a user. Thus, the examples provided herein with respect to the placeholders 114 and the extensions 110 should be understood as being illustrative and should not be construed as being limiting in any way. In particular, the concepts and technologies disclosed herein for providing placeholders 114 for extensions 110 can be provided within any type of application programs 108 and/or application environments.

Figure 4C:
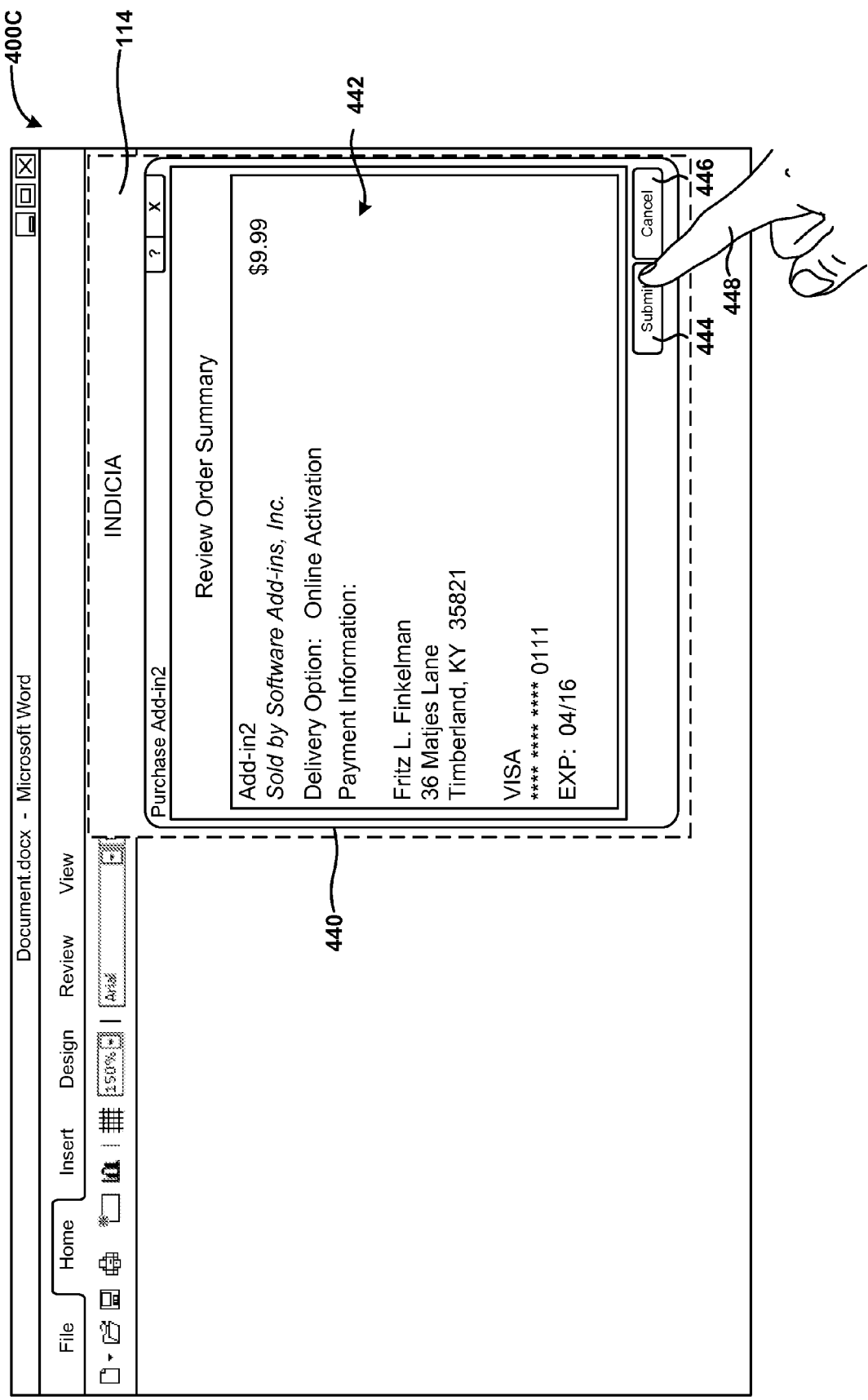

Turning now to FIG. 4C, additional aspects of the concepts and technologies disclosed herein for presenting user interface placeholders for application extensions will be described, according to another illustrative embodiment. In particular, FIG. 4C shows a screen display 400C generated by the user device 102. It should be appreciated that the screen display 400C illustrated in FIG. 4C is illustrative and should not be construed as being limiting in any way.

The screen display 400C shown in FIG. 4C can be, but is not necessarily, generated by the user device 102 in response to detecting an interaction with the placeholder 114. For example, the placeholder 114 can include UI controls for purchasing, activating, or otherwise obtaining entitlement to an extension 110 associated with the placeholder 114, though this is not necessarily the case. As shown, the screen display 400C is displaying an extension purchase window 440. According to various embodiments, the extension purchase window 440 can be launched from the placeholder 114. Thus, in some embodiments such as the embodiment illustrated in FIG. 4C, the placeholder 114 can be expanded to include the extension purchase window 440. It should be understood that this embodiment is illustrative, and should not be construed as being limiting in any way. The extension purchase window 440 includes a purchase details area 442. It should be understood that the extension purchase window 440 can provide various views or displays to guide a user through a purchase or other entitlement process. For example, the extension purchase window 440 can include a view that presents fields for users to provide the information shown in the purchase details area 442, though this is not necessarily the case.

In some embodiments, the entitlement process includes agreeing to usage terms, signing up for a free trial version, submitting user information, or other processes not shown in FIG. 4C. As such, the embodiment illustrated in FIG. 4C is illustrative and should not be construed as being limiting in any way. The extension purchase window 440 also displays a submit UI control 444 for finalizing an extension purchase or entitlement process and a cancel UI control 446 for exiting the entitlement process. Selection of the submit UI control 444 illustrated in FIG. 4C can complete a purchase process, to download the extension 110, and/or cause the web server 116 or other device to issue a application callback 122 to update the placeholder 114, if desired. As shown in FIG. 4C, a user can select the submit UI control 444 using his or her finger 448 or other input.

As explained above, the concepts and technologies disclosed herein also can be used to launch entitlement processes outside of the application program 108 into which the extension 110 has been inserted. For example, the user device 102 can launch a web browser or other application program 108 to complete the entitlement process, if desired. An example of a screen display 400D for providing an embodiment for completing an entitlement process outside of the application program 108 is illustrated in FIG. 4D.

Figure 4D:
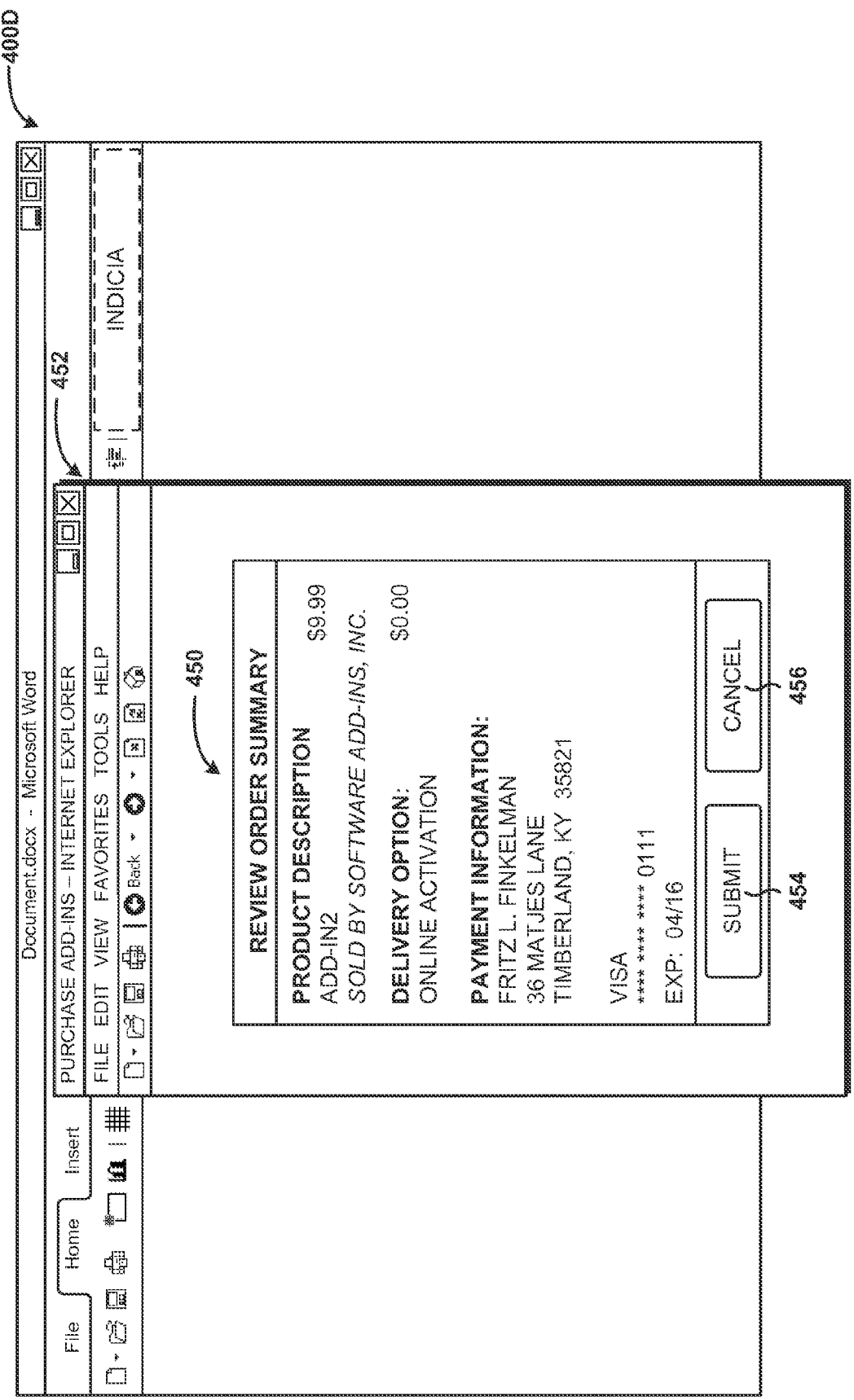

The screen display 400D illustrated in FIG. 4D includes an order summary review area 450. As shown in FIG. 4D, the order summary review area can be shown in another application window such as, for example, a browser window 452. As explained above, selection of the placeholder 114 can cause the user device 102 to launch a web browser or other application external to the application program 108 into which the placeholder 114 is inserted, to complete the entitlement process. In the embodiment illustrated in FIG. 4D, selection of the placeholder 114 causes the user device 102 to launch the web browser in the browser window 452 for completion of the entitlement process. It should be understood that this embodiment is illustrative, and should not be construed as being limiting in any way.

The order summary review area 450 can include a submit option 454 for completing the purchase of the extension 110. The order summary review area 450 also can include a cancel option 456 for exiting the entitlement process. As shown in FIG. 4D, the order summary review area 450 can indicate order, user, delivery, and payment information. In some embodiments, the order summary review area 450 indicates usage terms or requires consent by a user, but does not require or display payment information. As such, the illustrated embodiment should be understood as being illustrative and not limiting in any way. It should be understood from the above description that selection of the submit option 454 can prompt issuance or execution of a application callback 122. Similarly, selection of the submit option 454 can prompt download and/or installation of the extension 110.

Figure 4E:
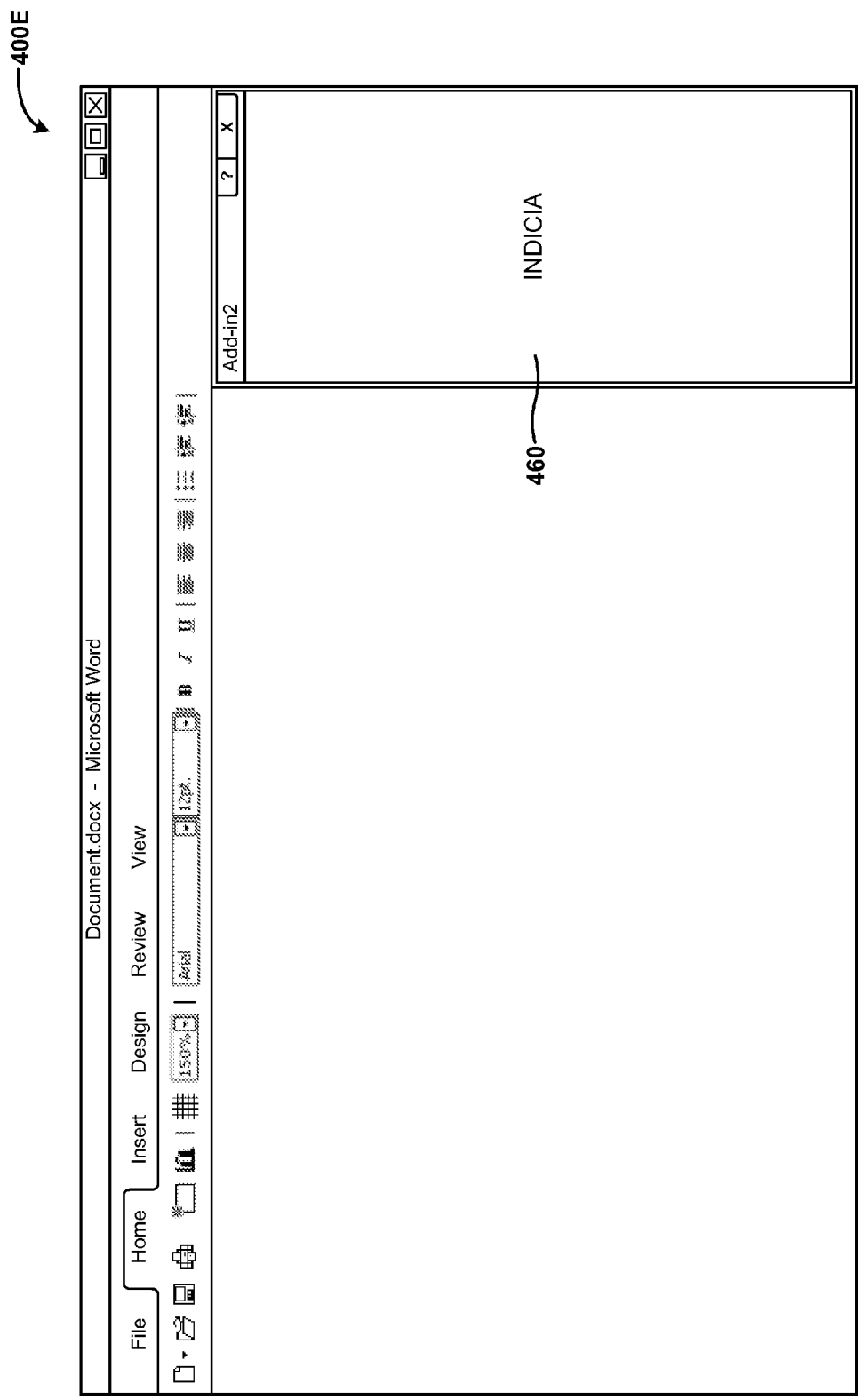

Turning now to FIG. 4E, additional aspects of the concepts and technologies disclosed herein for presenting user interface placeholders for application extensions will be described, according to yet another illustrative embodiment. In particular, FIG. 4E shows a screen display 400E generated by the user device 102 in response to detecting completion of an entitlement process. It should be appreciated that the screen display 400E illustrated in FIG. 4E is illustrative and should not be construed as being limiting in any way.

The screen display 400E shown in FIG. 4E can be, but is not necessarily, generated by the user device 102 in response to detecting selection of the submit UI control 444 illustrated in FIG. 4C or the submit option 454 illustrated in FIG. 4D. As shown, the screen display 400E includes a UI control 460 for accessing functionality associated with the extension 110. In the embodiment illustrated in FIG. 4E, the UI control 460 is illustrated as a task pane or side panel for presenting various functions associated with the extension 110. It should be understood from the above description that the placeholder 114 can be displayed in a configuration that is similar or even identical to the configuration of the UI control 460 shown in FIG. 4E.

Figure 4F:
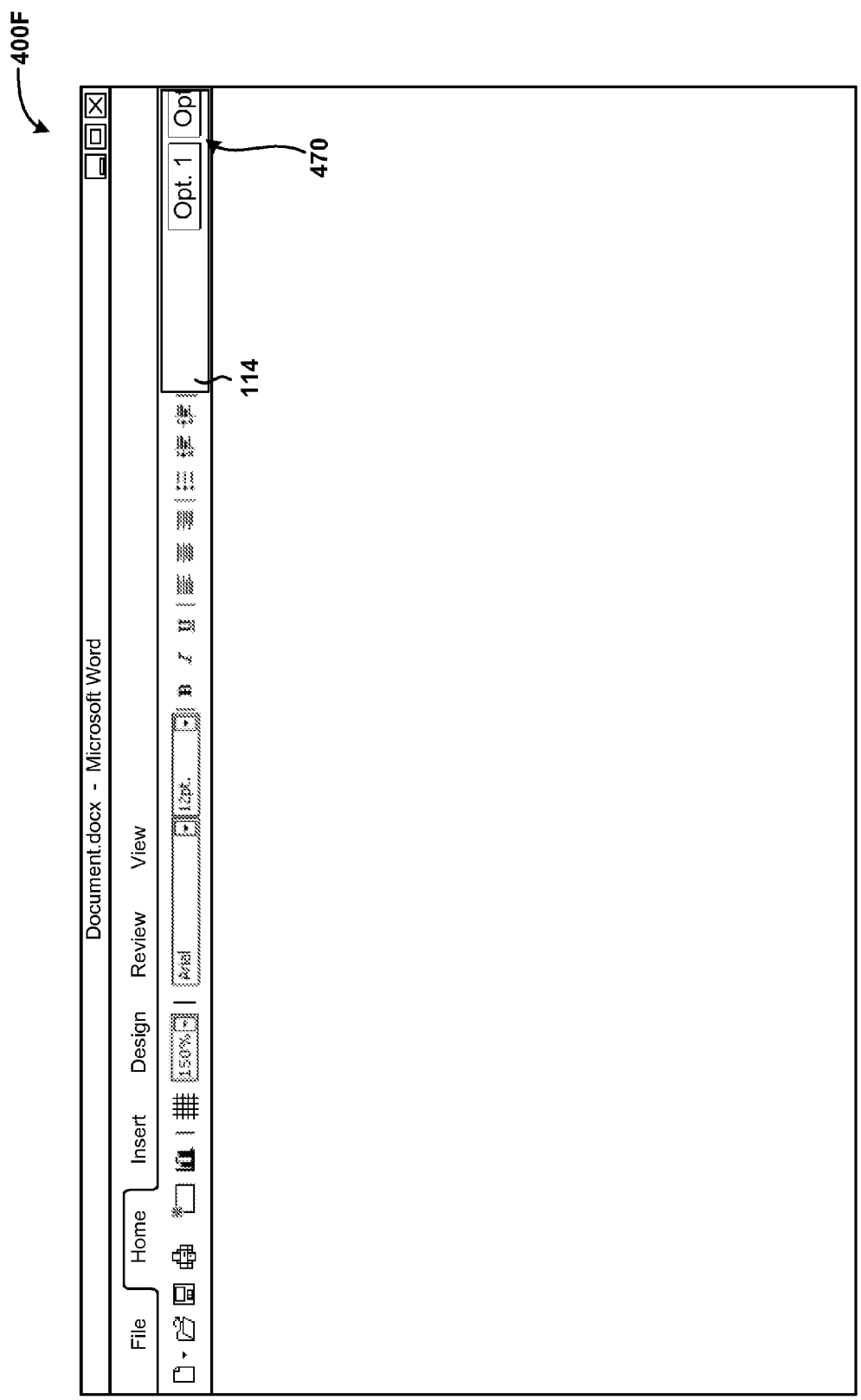
Figure 4G:
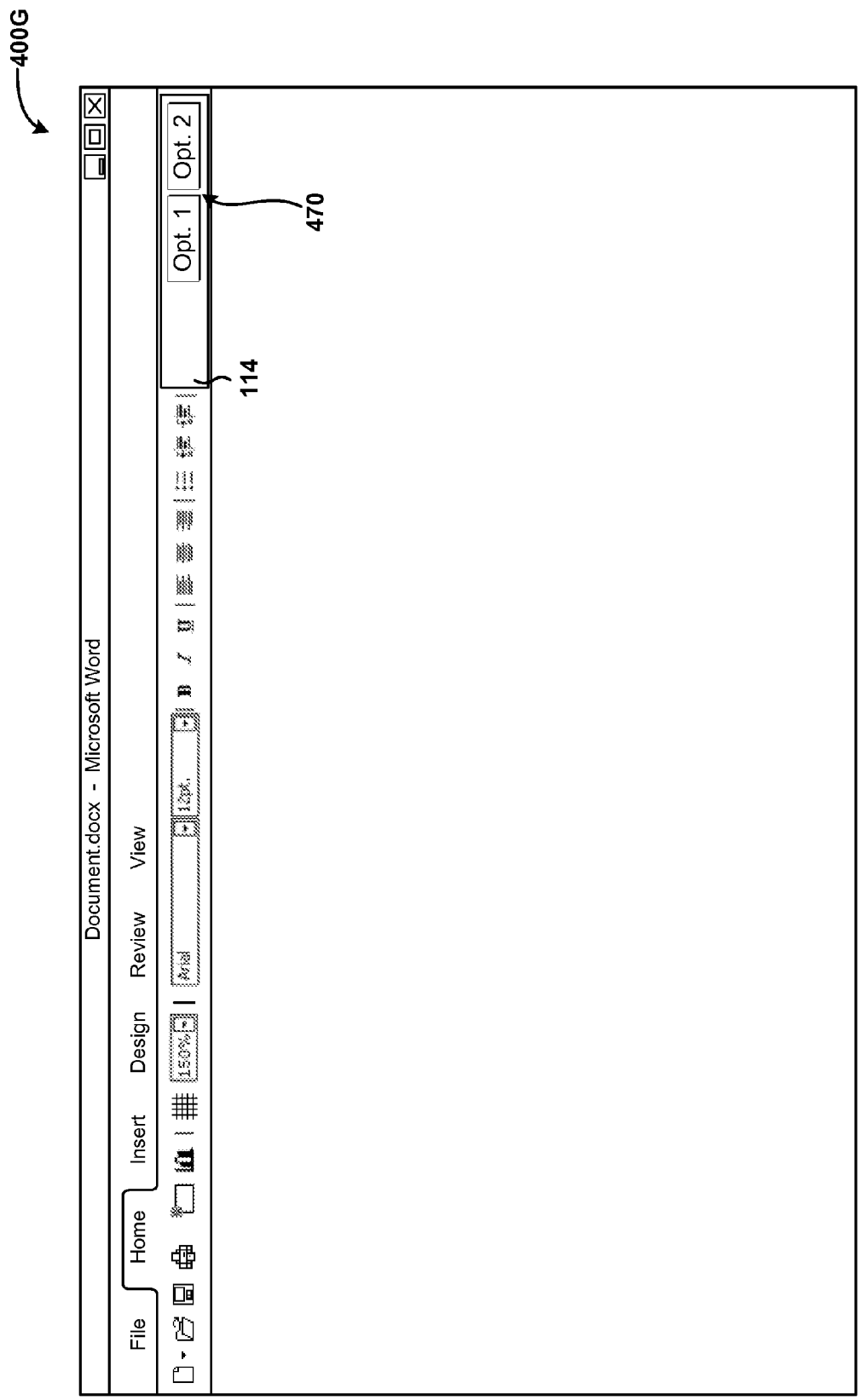
Figure 4H:
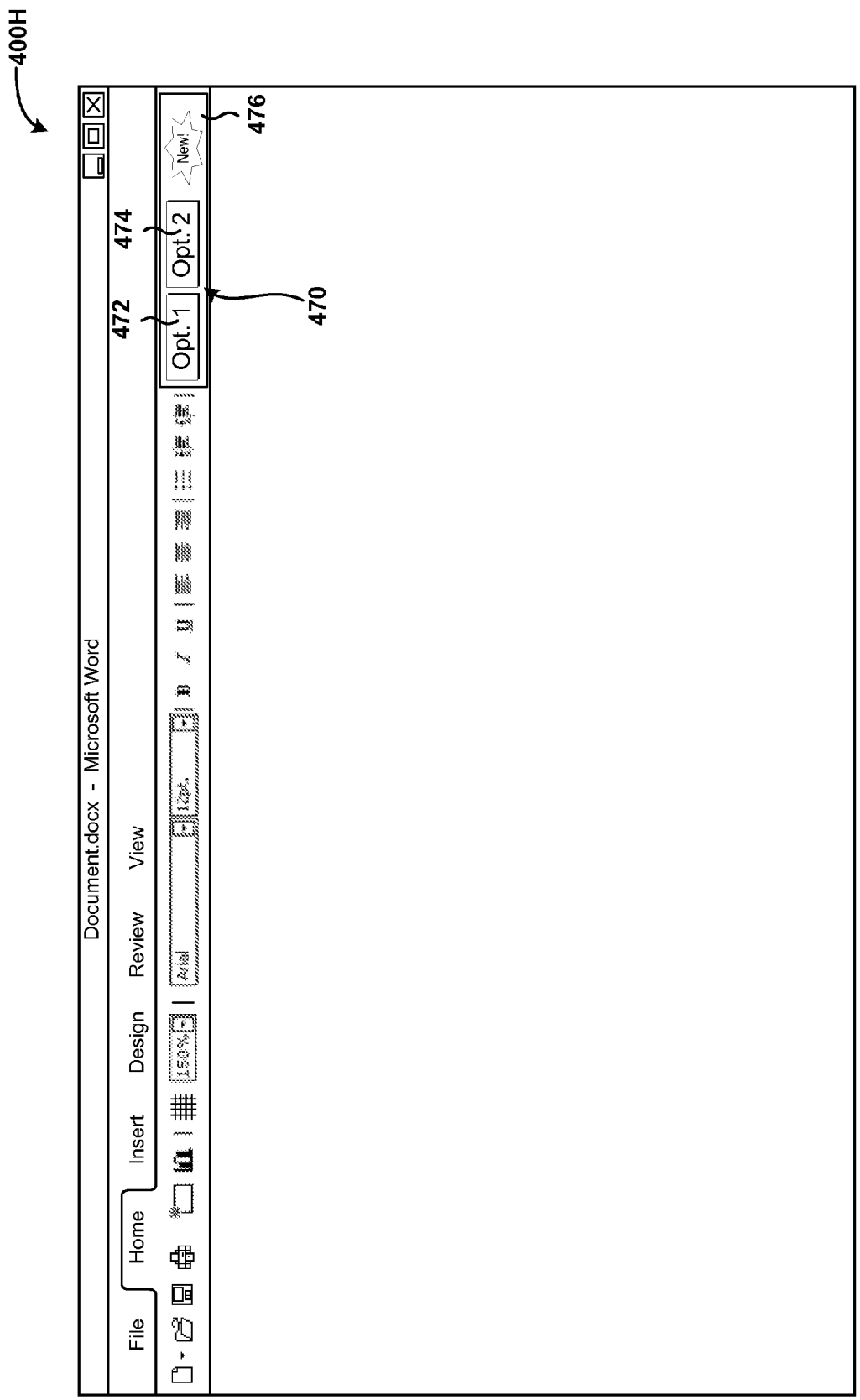

Turning now to FIGS. 4F-4H, additional aspects of the concepts and technologies disclosed herein for presenting user interface placeholders for application extensions will be described. In particular, FIGS. 4F-4H show an example transition effect for transitioning a placeholder 114 into a UI control for accessing an extension 110. Because various transition effects are contemplated and are possible, the transition effect illustrated in FIGS. 4F-4H should be understood as being illustrative.

The transition effect can be applied, for example, to the placeholder 114 illustrated in FIG. 4B upon determining that an entitlement process is complete. In response to determining that the entitlement process is completed, the user device 102 can update the screen display 400B to present an animated transition including the screen display 400F, the screen display 400G, the screen display 400H, and/or other screen displays. In the illustrated embodiment, the indicia 430 of the placeholder 114 transitions to animate scrolling into view the new indicia 470. The new indicia 470 can indicate that the entitlement process is complete by presenting UI controls 472, 474 for providing various functionality associated with the extension 110. As such, the placeholder 114 can be transitioned to provide a fully functioning UI control 476 for accessing the activated extension 110.

In some contemplated embodiments, transition effects are applied including scrolling the placeholder 114 out of view and the UI control 476 for accessing the activated extension 110 into view; cross-dissolving the placeholder 114 and the UI control 476 for accessing the activated extension 110; dissolving the placeholder 114 to reveal the UI control 476 for accessing the activated extension 110; cross-fading the placeholder 114 and the UI control 476 for accessing the activated extension 110; and/or other effects. Because the transition effects can be animated across a large number of animation frames, it should be understood that the illustrated screen displays 400B, 400F, 400G, and 400H are illustrative of the transition effect and should not be construed as being limiting.

Figure 5:
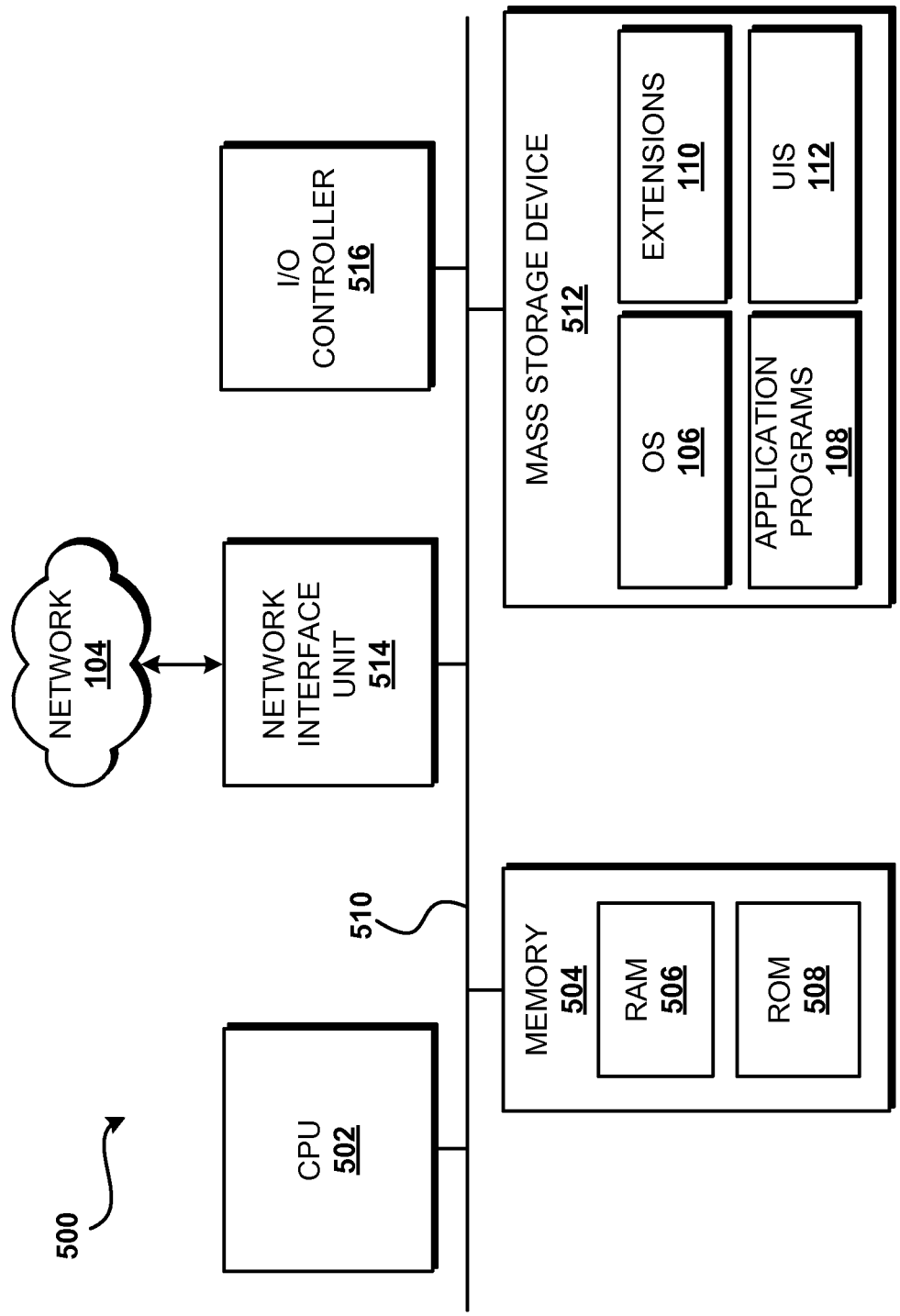
FIG. 5 is a computer architecture diagram showing an illustrative computer hardware and software architecture for a computing system capable of implementing aspects of the embodiments presented herein.

FIG. 5 illustrates an illustrative computer architecture 500 for a device capable of executing the software components described herein for presenting user interface placeholders for application extensions. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106, the application programs 108, the extensions 110, and/or other application programs. The mass storage device 512 also can be configured to store the UIs 112 and/or other data, if desired. Although not shown in FIG. 5, it should be understood that the mass storage device 512 also can store the placeholders 114, the extension data 120, the application callbacks 122, and/or other data.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 546514 also may be utilized to connect to other types of networks and remote computer systems, for example, the web server 116 and/or other systems or devices. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
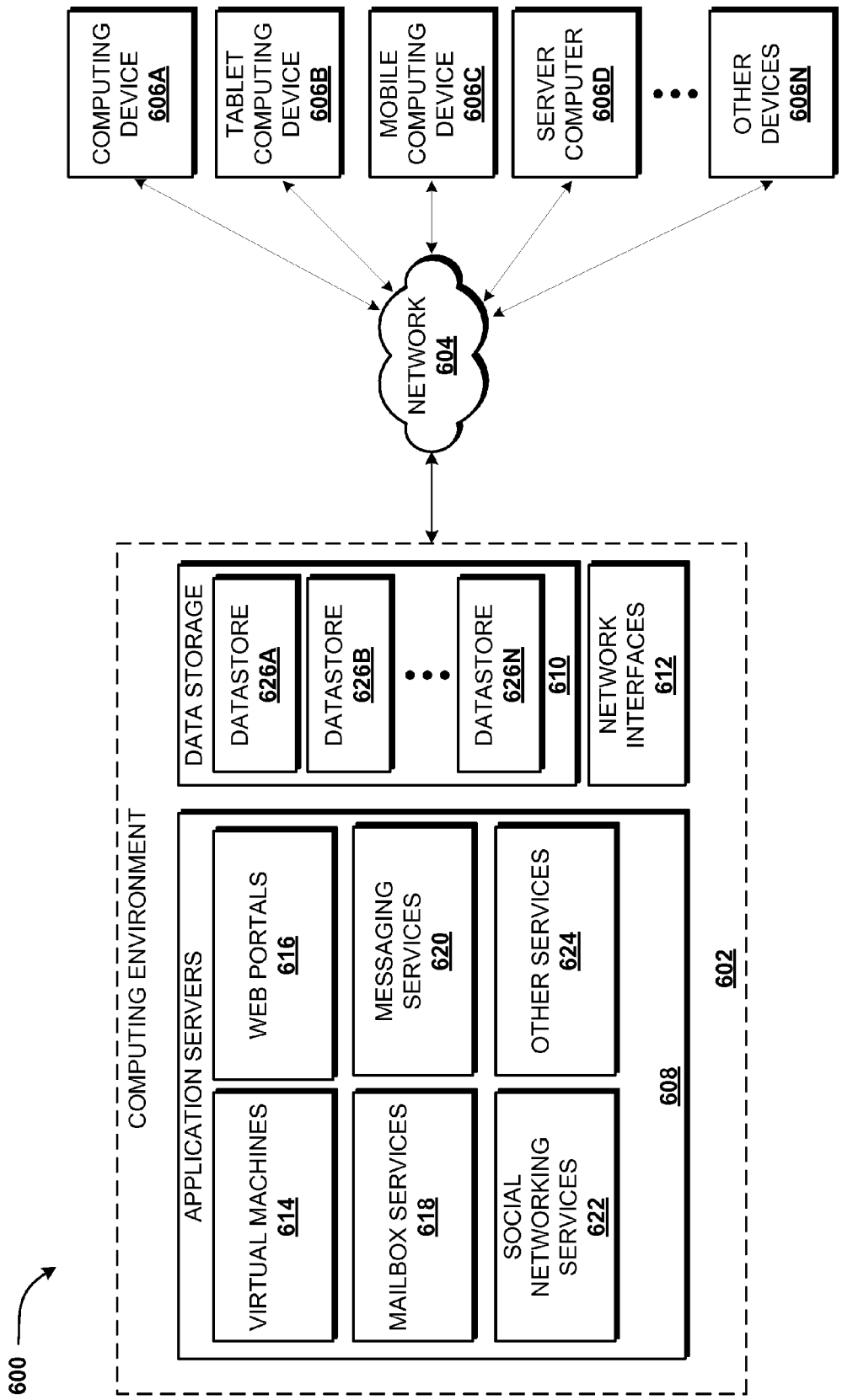
FIG. 6 is a diagram illustrating a distributed computing environment capable of implementing aspects of the embodiments presented herein.

FIG. 6 illustrates an illustrative distributed computing environment 600 capable of executing the software components described herein for presenting user interface placeholders for application extensions. Thus, the distributed computing environment 600 illustrated in FIG. 6 can be used to provide the functionality described herein with respect to the user device 102 and/or the web server 116. The distributed computing environment 600 may be utilized to execute any aspects of the software components presented herein.

According to various implementations, the distributed computing environment 600 includes a computing environment 602 operating on, in communication with, or as part of the network 604. The network 604 also can include various access networks. According to various implementations, the functionality of the network 604 is provided by the network 104 illustrated in FIGS. 1 and 5. One or more client devices 606A-606N (hereinafter referred to collectively and/or generically as "clients 606") can communicate with the computing environment 602 via the network 604 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated embodiment, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for presenting user interface placeholders for application extensions. It should be understood that this embodiment is illustrative, and should not be construed as being limiting in any way. The application servers 608 also host or provide access to one or more Web portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also can include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 622 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above embodiments are illustrative, and should not be construed as being limited in any way.

As shown in FIG. 6, the application servers 608 also can host other services, applications, portals, and/or other resources ("other resources") 624. The other resources 624 can include, but are not limited to, services provided by the web server 116. It thus can be appreciated that the computing environment 602 can provide integration of the concepts and technologies disclosed herein provided herein for presenting user interface placeholders for application extensions with various mailbox, messaging, social networking, and/or other services or resources. For example, the concepts and technologies disclosed herein can be used to provide placeholders 114 within application programs 108, wherein the extensions 110 associated with the placeholders 114 provide various social networking, messaging functions, and/or other services or functions.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store the server application 118, the extension data 120, and/or the application callbacks 122, if desired.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for presenting user interface placeholders for application extensions.

Figure 7:
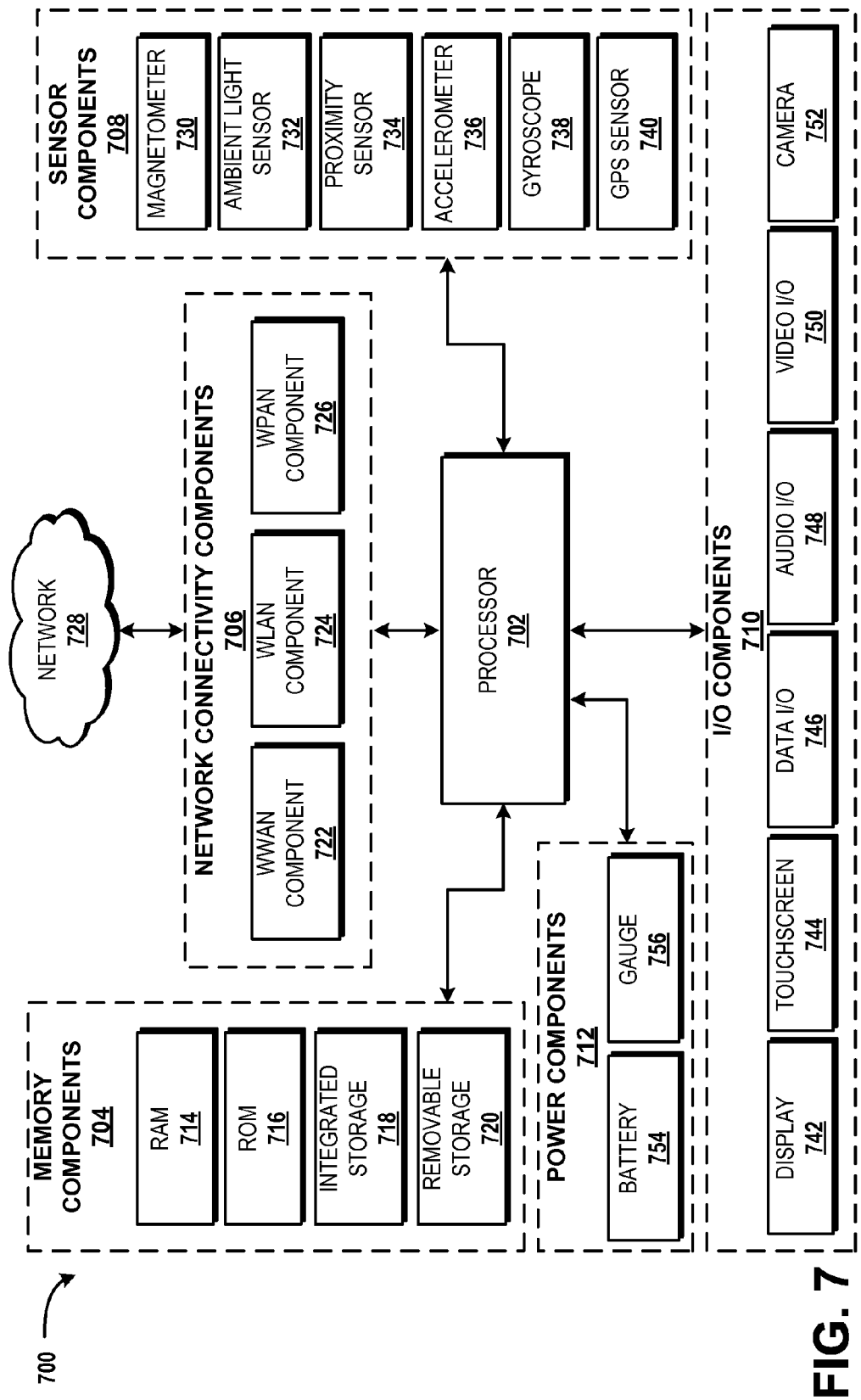
FIG. 7 is a computer architecture diagram illustrating a computing device architecture capable of implementing aspects of the embodiments presented herein.

Turning now to FIG. 7, an illustrative computing device architecture 700 for a computing device that is capable of executing various software components described herein for presenting user interface placeholders for application extensions is illustrated, according to one embodiment. The computing device architecture 700 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 700 is applicable to any of the clients 606 shown in FIG. 6. Furthermore, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some embodiments, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some embodiments, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some embodiments, the RAM 714 or a portion thereof, the ROM 716 or a portion thereof, and/or some combination the RAM 714 and the ROM 716 is integrated in the processor 702. In some embodiments, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which may be a WWAN, a WLAN, or a WPAN. Although a single network 728 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN. In some embodiments, the network 728 is provided by one or more of the networks 104, 604. In some embodiments, the network 728 includes the networks 104, 604. In yet other embodiments, the network 728 provides access to the networks 104, 604.

The network 728 may be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 728 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 may be configured to provide voice and/or data communications with any combination of the above technologies. The network 728 may be configured to or adapted to provide voice and/or data communications in accordance with future generation technologies.

In some embodiments, the WWAN component 722 is configured to provide dual-multi-mode connectivity to the network 728. For example, the WWAN component 722 may be configured to provide connectivity to the network 728, wherein the network 728 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 728 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 724 is configured to connect to the network 728 via the WI-FI access points. Such connections may be secured via various encryption technologies including, but not limited. WI-FI Protected Access ("WPA"), WPA2, Wired Equivalent Privacy ("WEP"), and the like.

The network 728 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to temperature sensors or shock detection sensors, also may be incorporated in the computing device architecture 700.

The magnetometer 730 is configured to measure the strength and direction of a magnetic field. In some embodiments the magnetometer 730 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 730 are contemplated.

The ambient light sensor 732 is configured to measure ambient light. In some embodiments, the ambient light sensor 732 provides measurements to an application program stored within one the memory components 704 in order to automatically adjust the brightness of a display (described below) to compensate for low-light and high-light environments. Other uses of measurements obtained by the ambient light sensor 732 are contemplated.

The proximity sensor 734 is configured to detect the presence of an object or thing in proximity to the computing device without direct contact. In some embodiments, the proximity sensor 734 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some embodiments, output from the accelerometer 736 is used by an application program as an input mechanism to control some functionality of the application program. For example, the application program may be a video game in which a character, a portion thereof, or an object is moved or otherwise manipulated in response to input received via the accelerometer 736. In some embodiments, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some embodiments, output from the gyroscope 738 is used by an application program as an input mechanism to control some functionality of the application program. For example, the gyroscope 738 can be used for accurate recognition of movement within a 3D environment of a video game application or some other application. In some embodiments, an application program utilizes output from the gyroscope 738 and the accelerometer 736 to enhance control of some functionality of the application program. Other uses of the gyroscope 738 are contemplated.

The GPS sensor 740 is configured to receive signals from GPS satellites for use in calculating a location. The location calculated by the GPS sensor 740 may be used by any application program that requires or benefits from location information. For example, the location calculated by the GPS sensor 740 may be used with a navigation application program to provide directions from the location to a destination or directions from the destination to the location. Moreover, the GPS sensor 740 may be used to provide location information to an external location-based service, such as E911 service. The GPS sensor 740 may obtain location information generated via WI-FI, WIMAX, and/or cellular triangulation techniques utilizing one or more of the network connectivity components 706 to aid the GPS sensor 740 in obtaining a location fix. The GPS sensor 740 may also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some embodiments, the display 742 and the touchscreen 744 are combined. In some embodiments two or more of the data I/O component 746, the audio I/O component 748, and the video I/O component 750 are combined. The I/O components 710 may include discrete processors configured to support the various interface described below, or may include processing functionality built-in to the processor 702.

The display 742 is an output device configured to present information in a visual form. In particular, the display 742 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 742 is a liquid crystal display ("LCD") utilizing any active or passive matrix technology and any backlighting technology (if used). In some embodiments, the display 742 is an organic light emitting diode ("OLED") display. Other display types are contemplated.

The touchscreen 744 is an input device configured to detect the presence and location of a touch. The touchscreen 744 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 744 is incorporated on top of the display 742 as a transparent layer to enable a user to use one or more touches to interact with objects or other information presented on the display 742. In other embodiments, the touchscreen 744 is a touch pad incorporated on a surface of the computing device that does not include the display 742. For example, the computing device may have a touchscreen incorporated on top of the display 742 and a touch pad on a surface opposite the display 742.

In some embodiments, the touchscreen 744 is a single-touch touchscreen. In other embodiments, the touchscreen 744 is a multi-touch touchscreen. In some embodiments, the touchscreen 744 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 744. As such, a developer may create gestures that are specific to a particular application program.

In some embodiments, the touchscreen 744 supports a tap gesture in which a user taps the touchscreen 744 once on an item presented on the display 742. The tap gesture may be used for various reasons including, but not limited to, opening or launching whatever the user taps. In some embodiments, the touchscreen 744 supports a double tap gesture in which a user taps the touchscreen 744 twice on an item presented on the display 742. The double tap gesture may be used for various reasons including, but not limited to, zooming in or zooming out in stages. In some embodiments, the touchscreen 744 supports a tap and hold gesture in which a user taps the touchscreen 744 and maintains contact for at least a pre-defined time. The tap and hold gesture may be used for various reasons including, but not limited to, opening a context-specific menu.

In some embodiments, the touchscreen 744 supports a pan gesture in which a user places a finger on the touchscreen 744 and maintains contact with the touchscreen 744 while moving the finger on the touchscreen 744. The pan gesture may be used for various reasons including, but not limited to, moving through screens, images, or menus at a controlled rate. Multiple finger pan gestures are also contemplated. In some embodiments, the touchscreen 744 supports a flick gesture in which a user swipes a finger in the direction the user wants the screen to move. The flick gesture may be used for various reasons including, but not limited to scrolling horizontally or vertically through menus or pages. In some embodiments, the touchscreen 744 supports a pinch and stretch gesture in which a user makes a pinching motion with two fingers (e.g., thumb and forefinger) on the touchscreen 744 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 744. As such, the above gestures should be understood as being illustrative and should not be construed as being limiting in any way.

The data I/O interface component 746 is configured to facilitate input of data to the computing device and output of data from the computing device. In some embodiments, the data I/O interface component 746 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 748 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 748 includes a speaker for the output of audio signals. In some embodiments, the audio I/O interface component 746 includes an optical audio cable out.

The video I/O interface component 750 is configured to provide video input and/or output capabilities to the computing device. In some embodiments, the video I/O interface component 750 includes a video connector configured to receive video as input from another device (e.g., a video media player such as a DVD or BLURAY player) or send video as output to another device (e.g., a monitor, a television, or some other external display). In some embodiments, the video I/O interface component 750 includes a High-Definition Multimedia Interface ("HDMI"), mini-HDMI, micro-HDMI, DisplayPort, or proprietary connector to input/output video content. In some embodiments, the video I/O interface component 750 or portions thereof is combined with the audio I/O interface component 748 or portions thereof.

The camera 752 can be configured to capture still images and/or video. The camera 752 may utilize a charge coupled device ("CCD") or a complementary metal oxide semiconductor ("CMOS") image sensor to capture images. In some embodiments, the camera 752 includes a flash to aid in taking pictures in low-light environments. Settings for the camera 752 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 754, which can be connected to a battery gauge 756. The batteries 754 may be rechargeable or disposable. Rechargeable battery types include, but are not limited to, lithium polymer, lithium ion, nickel cadmium, and nickel metal hydride. Each of the batteries 754 may be made of one or more cells.

The battery gauge 756 can be configured to measure battery parameters such as current, voltage, and temperature. In some embodiments, the battery gauge 756 is configured to measure the effect of a battery's discharge rate, temperature, age and other factors to predict remaining life within a certain percentage of error. In some embodiments, the battery gauge 756 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component 744.

Based on the foregoing, it should be appreciated that technologies for user interface placeholders for application extensions have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for inserting a placeholder into a user interface, the computer-implemented method comprising performing computer-implemented operations for:
    presenting in the user interface a suggestion of an extension for activation;
    receiving input requesting activation of the extension by way of the user interface;
    in response to receiving the input:
        inserting the placeholder into the user interface;
        configuring the placeholder based, at least partially, upon data received from the extension indicating functionality that is associated with the extension; and
        initiating an entitlement process to obtain rights to use the functionality associated with the extension;
    determining if the entitlement process is completed; and
    in response to determining that the entitlement process is completed, updating the placeholder to indicate entitlement to the extension.

2. The computer-implemented method of claim 1, wherein the user interface comprises a suggested extensions window for suggesting the extension.

3. The computer-implemented method of claim 1, wherein inserting the placeholder comprises obtaining the data received from the extension from a web server.

4. The computer-implemented method of claim 1, wherein the data received from the extension comprises a description of the extension and instructions for activating the extension via the entitlement process, and wherein the placeholder includes visual indicia for presenting at least a portion of the extension data.

5. The computer-implemented method of claim 1, further comprising executing an application callback upon completing the entitlement process.

6. The computer-implemented method of claim 5, wherein the application callback comprises:
    searching for the placeholder;
    bringing an application program presenting the user interface to a foreground of a screen display; and
    refreshing the placeholder to indicate completion of the entitlement process.

7. The computer-implemented method of claim 6, wherein refreshing the placeholder comprises replacing the placeholder with a user interface control for accessing the functionality associated with the extension.

8. The computer-implemented method of claim 1, wherein initiating the entitlement process comprises accessing a web server hosting the entitlement process.

9. The computer-implemented method of claim 8, wherein the web server is accessed via a web browser executing on a user device.

10. The computer-implemented method of claim 8, wherein the web server is accessed via user interface controls presented on the user interface.

11. An apparatus comprising:
    a processor;
    a memory communicatively coupled to the processor; and
    an application program which executes in the processor from the memory and which, when executed by the processor, causes the processor to:
        suggest, at the application program, an extension for activation at the apparatus;
        receive, at the apparatus, input requesting activation of the extension;
        in response to receiving the input:
            insert a placeholder into a user interface presented at the apparatus, the placeholder providing an indication of functionality associated with the extension; and
            initiate, at the apparatus an entitlement process to obtain rights to use the functionality associated with the extension;
        determine if the entitlement process is completed; and
        in response to determining that the entitlement process is completed, update the placeholder to indicate entitlement to use the extension at the application program.

12. The apparatus of claim 11, wherein the extension comprises computer-executable instructions for extending the functionality of the application program.

13. The apparatus of claim 11, wherein the memory stores further computer-executable instructions that, when executed by the processor, cause the processor to execute an application callback upon completing the entitlement process.

14. The apparatus of claim 13, wherein the application callback comprises computer-executable instructions that, when executed by the processor, cause the processor to:
    search for the placeholder;
    bring the application program presenting the user interface presented at the apparatus to a foreground of a screen display; and
    refresh the placeholder to indicate completion of the entitlement process.

15. The apparatus of claim 11, wherein inserting the placeholder comprises:
    obtain extension data from a web server, the extension data comprising a description of the extension and instructions for activating the extension via the entitlement process; and
    wherein the placeholder comprises visual indicia for presenting at least a portion of the extension data.

16. The apparatus of claim 14, wherein refreshing the placeholder comprises replacing the placeholder with a user interface control for accessing the functionality associated with the extension.

17. A computer storage medium having computer readable instructions stored thereupon that, when executed by a computer, cause the computer to:
- suggest, at a user device executing an application program, an extension for activation at the user device, the extension comprising computer-executable instructions for extending functionality of the application program;
- receive, at the user device, input requesting activation of the extension;
- in response to receiving the input:
  - insert a placeholder into a user interface presented at the user device, the placeholder providing an indication of functionality associated with the extension; and
  - initiate, at the user device an entitlement process to obtain rights to use the functionality associated with the extension:
- determine if the entitlement process is completed; and
- in response to determining that the entitlement process is completed, update the placeholder to indicate entitlement to use the extension at the user device.

18. The computer storage medium of claim 17, further comprising computer-executable instructions that, when executed by the computer, cause the computer to:
- execute an application callback upon completing the entitlement process, the application callback comprising computer-executable instructions that, when executed by the user device, cause the computer device to
  - search for the placeholder,
  - bring an application program presenting the user interface presented at the user device to a foreground of a screen display, and
  - refresh the placeholder to indicate completion of the entitlement process.

19. The computer storage medium of claim 17, wherein inserting the placeholder comprises obtaining the data received from the extension from a web server.

20. The computer storage medium of claim 17, wherein initiating the entitlement process comprises accessing a web server hosting the entitlement process and, wherein the web server is accessed via user interface controls presented on the user device.

* * * * *